United States Patent
Yoo et al.

(10) Patent No.: US 11,420,988 B2
(45) Date of Patent: Aug. 23, 2022

(54) CATALYST FOR ASYMMETRIC HYDROGENATION OF COMPOUND CONTAINING CARBON DOUBLE BOND

(71) Applicant: GLACEUM INC., Suwon-si (KR)

(72) Inventors: Sang Ku Yoo, Suwon-si (KR); Ku Suk Kang, Yongin-si (KR); Jin Young Kim, Suwon-si (KR); Jung Woo Lee, Anyang-si (KR); Ji Young Kim, Seoul (KR); Jeong Ho Im, Yongin-si (KR)

(73) Assignee: GLACEUM, INC., Suwon-si (KR)

( * ) Notice: Subject to any disclaimer, the term of this patent is extended or adjusted under 35 U.S.C. 154(b) by 0 days.

(21) Appl. No.: 17/281,652

(22) PCT Filed: Oct. 2, 2019

(86) PCT No.: PCT/KR2019/012967
§ 371 (c)(1),
(2) Date: Mar. 31, 2021

(87) PCT Pub. No.: WO2020/071818
PCT Pub. Date: Apr. 9, 2020

(65) Prior Publication Data
US 2021/0395282 A1 Dec. 23, 2021

(30) Foreign Application Priority Data

Oct. 2, 2018 (KR) .......... 10-2018-0117777
Sep. 24, 2019 (KR) .......... 10-2019-0117657

(51) Int. Cl.
*C07F 15/00* (2006.01)
*B01J 31/02* (2006.01)
*B01J 31/18* (2006.01)
*B01J 31/22* (2006.01)

(52) U.S. Cl.
CPC ....... *C07F 15/0033* (2013.01); *B01J 31/0231* (2013.01); *B01J 31/189* (2013.01); *B01J 31/2295* (2013.01); *B01J 2231/645* (2013.01); *B01J 2531/827* (2013.01)

(58) Field of Classification Search
None
See application file for complete search history.

(56) References Cited

U.S. PATENT DOCUMENTS

2007/0027329 A1   2/2007   Setchell et al.

FOREIGN PATENT DOCUMENTS

EP            3524609 A1     8/2019
KR     1020180037584 A      4/2018

OTHER PUBLICATIONS

Dieguez, M. et al. "Modular Phosphite-Oxazoline/Oxazine Ligand Library for Asymmetric Pd-Catalyzed Allylic Substitution Reactions: Scope and Limitations—Origin of Enantioselectivity" Chemistry, vol. 14:3653-3669 (2008).
Mazuela, J. et al. "Iridium Phosphite-Oxazoline Catalysts for the Highly Enantioselective Hydrogenation of Terminal Alkenes" Journal of the American Chemical Society, vol. 131:12344-12353 (2009).
Woodmansee, D.H. et al. "Iridium-Catalyzed Asymmetric Hydrogenation of Olefins with Chiral N,P and C,N Ligands" Top Organomet Chem vol. 34:31-76 (2011).
International Search Report corresponding to PCT/KR2019/012967; dated Jan. 23, 2020 (4 pages, including English translation).

*Primary Examiner* — Yun Qian
(74) *Attorney, Agent, or Firm* — Myers Bigel, P.A.

(57) ABSTRACT

The present invention may provide an asymmetric hydrogenation catalyst capable of resolving enantiomers with excellent enantioselectivity from a carbon-carbon double bond-containing compound. The catalyst according to one embodiment of the present invention includes: an iridium cation; and a ligand bonded to the iridium cation.

6 Claims, No Drawings

CATALYST FOR ASYMMETRIC HYDROGENATION OF COMPOUND CONTAINING CARBON DOUBLE BOND

CROSS REFERENCE TO RELATED APPLICATIONS

This application is a 35 U.S.C. § 371 national stage application of PCT International Application No. PCT/KR2019/012967, filed Oct. 2, 2019, which claims priority from Korean Patent Application No. 10-2018-0117777, filed Oct. 2, 2018 and from Korean Patent Application No. 10-2019-0117657 filed Sep. 24, 2019, the contents of which are incorporated herein in their entireties by reference. The above-referenced PCT International Application was published in the Korean language as International Publication No. WO 2020/071818 A1 on Apr. 9, 2020.

TECHNICAL FIELD

The present invention relates to a catalyst for asymmetric hydrogenation of a carbon-carbon double bond-containing compound.

More specifically, the present invention relates to a catalyst for asymmetric hydrogenation that may be used to produce enantiomers from a carbon-carbon double bond-containing compound.

BACKGROUND ART

Studies on methods of synthesizing a levorotatory enantiomer and a dextrorotatory enantiomer from a prochiral carbon-carbon double bond-containing compound by using asymmetric hydrogenation have attracted the attention of many researchers since the 1990s because of the usefulness and economics of these methods.

As many studies on asymmetric hydrogenation have been conducted by various researchers, a great technological breakthrough development has been made, and these studies are still underway. Most of the technologies that make this possible have mainly used ruthenium metal or rhodium metal complex catalysts, and have resulted in a satisfactory asymmetric induction of 98% ee or more. Asymmetric hydrogenation reactions using these catalysts are as shown in the following Reaction Scheme 1 and Reaction Scheme 2:

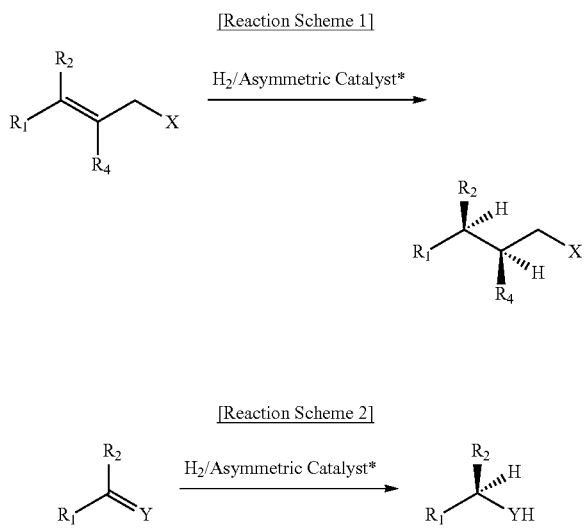

In Reaction Scheme 1 above, X represents OH, $NH_2$, NRH, $CO_2H$, $CONH_2$, $CONR_2$ or the like, and in Reaction Scheme 2 above, Y represents O, S, NH or the like. These carbon-carbon double bond-containing compounds generally have a polar functional group capable of bonding with the catalyst for asymmetric hydrogenation. Indeed, ruthenium metal or rhodium metal complex catalysts have shown poor reactivity in the asymmetric hydrogenation of carbon-carbon double bond-containing compounds containing no polar functional group.

Meanwhile, as catalysts for effectively carrying out the asymmetric hydrogenation of carbon-carbon double bond-containing compounds containing no polar functional group, iridium metal complexes have been mainly used instead of ruthenium metal or rhodium metal complexes. An iridium metal complex catalyst that is typically used is a type of Crabtree's catalyst in which N-donor and -P donor ligands are coordinated to the iridium metal center.

However, even when asymmetric hydrogenation is performed using the iridium metal complex, a recrystallization process needs to be repeated several times in order to obtain highly pure enantiomers, and in this case, a problem may arise in that the enantioselectivity decreases.

Meanwhile, the present inventors synthesized (S)-3-phenyl-2,3,4,8,9,10-hexahydropyrano[2,3-f]chromene or (R)-3-phenyl-2,3,4,8,9,10-hexahydropyrano[2,3-f]chromene derivatives from a compound of the following Formula by asymmetric hydrogenation using an iridium metal complex catalyst (Korean Patent Application No. 10-2017-0124941):

[Formula]

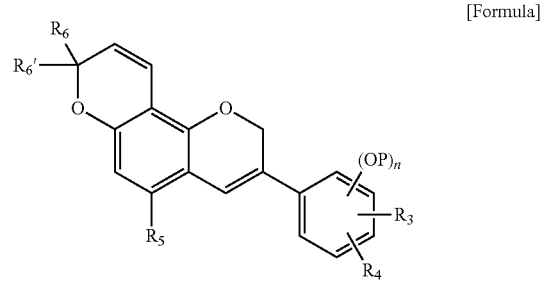

wherein $R_3$ and $R_4$ are each independently a hydrogen atom, a hydroxyl group, a substituted or unsubstituted, straight or branched $C_1$-$C_6$ alkyl group, a halogen atom, a substituted or unsubstituted, straight or branched $C_1$-$C_6$ alkoxy group, a substituted or unsubstituted, straight or branched $C_1$-$C_4$ thioalkyl group, a substituted or unsubstituted allyloxy group, a substituted or unsubstituted aryloxy group;

$R_5$ is a hydrogen atom, a $C_1$-$C_2$ alkyl group or a $C_1$-$C_2$ alkoxy group;

$R_6$ and $R_6'$ are each independently a hydrogen atom or a $C_1$-$C_6$ alkyl group;

P represents a protecting group of a substituted or unsubstituted, straight or branched $C_1$-$C_4$ alkyl group, a substituted or unsubstituted benzyl group, a substituted or unsubstituted allyl group, a t-butyldimethylsilyl group, a t-butyldiphenylsilyl group, a methylphenylsilyl group, a trimethylphenylsilyl group, $MeSO_2$, or p-$TsSO_2$;

n is 1 to 3;

when OP is plural in number, they are the same or different; and the substituent in the substituted alkyl group, substituted alkoxy group and substituted thioalkyl group is a halogen atom, a straight or branched $C_1$-$C_5$ alkyl group, a straight or branched $C_1$-$C_5$ alkoxy group, or a straight or branched $C_1$-$C_3$ thioalkyl group.

In this case, the (R)-enantiomer or the (S)-enantiomer could be synthesized with an enantioselectivity of 88% ee to 92% ee, and as the recrystallization process was repeated by using various organic solvents, the enantioselectivity of the obtained compound decreased rather than increased in some cases.

Thus, in order to produce large amounts of (S)-3-phenyl-2,3,4,8,9,10-hexahydropyrano[2,3-f]chromene or (R)-3-phenyl-2,3,4,8,9,10-hexahydropyrano[2,3-f]chromene derivatives as highly pure enantiomers, there has been an urgent need for a catalyst having excellent effects, which is capable of synthesizing enantiomers with high enantioselectivity even by only asymmetric hydrogenation without an additional recrystallization process.

DISCLOSURE

Technical Problem

The present invention intends to provide a catalyst for asymmetric hydrogenation, which is capable of resolving enantiomers with excellent enantioselectivity from a carbon-carbon double bond-containing compound.

However, problems to be solved by the present invention are not limited to the above-mentioned problem, and other problems which are not mentioned will be clearly understood by those skilled in the art from the following description.

Technical Solution

One embodiment of the present invention provides a catalyst for asymmetric hydrogenation of a carbon-carbon double bond-containing compound, including: an iridium cation; and a ligand of the following Formula 1, which is bonded to the iridium cation:

[Formula 1]

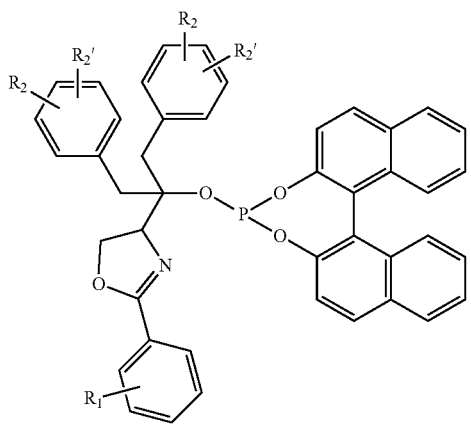

wherein
$R_1$ is a hydrogen atom, a substituted or unsubstituted, straight or branched $C_1$-$C_3$ alkyl group, or a substituted or unsubstituted, straight or branched $C_1$-$C_3$ alkoxy group;
$R_2$ and $R_2'$ are each independently a hydrogen atom, a substituted or unsubstituted, straight or branched $C_1$-$C_3$ alkyl group, or a substituted or unsubstituted, straight or branched $C_1$-$C_3$ alkoxy group; and
the substituent in the substituted alkyl group and substituted alkoxy group is a halogen atom, a straight or branched $C_1$-$C_3$ alkyl group, or a straight or branched $C_1$-$C_3$ alkoxy group.

Advantageous Effects

The catalyst for asymmetric hydrogenation according to one embodiment of the present invention is capable of producing enantiomers with high enantioselectivity from a carbon-carbon double bond-containing compound.

The effects of the present invention are not limited to the above-described effects, and the effects which are not mentioned will be clearly understood by those skilled in the art from the present specification and the accompanying drawings.

BEST MODE

Hereinafter, the present invention will be described in more detail.

Unless otherwise defined, all terms used herein, including technical and scientific terms, have the same meaning as commonly understood by one of ordinary skill in the art to which the present invention belongs. In addition, although preferred methods or samples are described in the present specification, those similar or equivalent thereto are also included within the scope of the present invention. The contents of all publications described herein by reference are incorporated herein by reference in their entirety.

Throughout the present specification, it is to be understood that, when any part is referred to as "including" any component, it does not exclude other components, but may further include other components, unless otherwise specified.

In the present specification, when the atomic groups of the formula are depicted by wedges or thick lines, assuming that the compound is viewed by eyes, the dotted wedge means that the atomic group is positioned away from the viewer, and the thick line and the solid wedge mean that the atomic group is positioned close to the viewer.

One embodiment of the present invention provides a catalyst for asymmetric hydrogenation of a carbon-carbon double bond-containing compound, including: an iridium cation; and a ligand of the following Formula 1, which is bonded to the iridium cation:

[Formula 1]

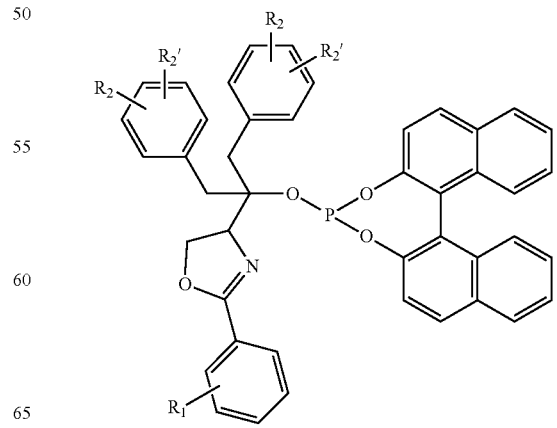

wherein

R₁ is a hydrogen atom, a substituted or unsubstituted, straight or branched $C_1$-$C_3$ alkyl group, or a substituted or unsubstituted, straight or branched $C_1$-$C_3$ alkoxy group;

$R_2$ and $R_2'$ are each independently a hydrogen atom, a substituted or unsubstituted, straight or branched $C_1$-$C_3$ alkyl group, or a substituted or unsubstituted, straight or branched $C_1$-$C_3$ alkoxy group; and the substituent in the substituted alkyl group and substituted alkoxy group is a halogen atom, a straight or branched $C_1$-$C_3$ alkyl group, or a straight or branched $C_1$-$C_3$ alkoxy group.

The catalyst for asymmetric hydrogenation according to one embodiment of the present invention is capable of producing enantiomers with excellent enantioselectivity from a carbon-carbon double bond-containing compound without performing a separate purification process.

According to one embodiment of the present invention, $R_1$, $R_2$ and $R_2'$ in Formula 1 above may each be a hydrogen atom.

According to one embodiment of the present invention, in Formula 1 above, $R_1$ may be a hydrogen atom, and $R_2$ and $R_2'$ may be each independently methyl, ethyl, n-propyl, isopropyl, 2-methylpropyl, or 2-ethylpropyl.

According to one embodiment of the present invention, in Formula 1 above, $R_1$ may be a hydrogen atom, and $R_2$ and $R_2'$ may be each independently methoxy, ethoxy, n-propoxy, isopropoxy, 2-methylpropoxy, or 2-ethylpropoxy.

According to one embodiment of the present invention, $R_2$ and $R_2'$ may each be a hydrogen atom, and $R_1$ may be methyl, ethyl, n-propyl, isopropyl, 2-methylpropyl, or 2-ethylpropyl.

According to one embodiment of the present invention, $R_2$ and $R_2'$ may each be a hydrogen atom, and $R_1$ may be methoxy, ethoxy, n-propoxy, isopropoxy, 2-methylpropoxy, or 2-ethylpropoxy.

According to one embodiment of the present invention, $R_2$ and $R_2'$ may each be a hydrogen atom, and $R_1$ may be chlorine- or fluorine-substituted methyl, chlorine- or fluorine-substituted ethyl, chlorine- or fluorine-substituted n-propyl, chlorine- or fluorine-substituted isopropyl, chlorine- or fluorine-substituted 2-methylpropyl, or chlorine- or fluorine-substituted 2-ethylpropyl.

According to one embodiment of the present invention, the ligand of Formula 1 may be an enantiomeric compound represented by the following Formula 2a or 2b:

[Formula 2a]

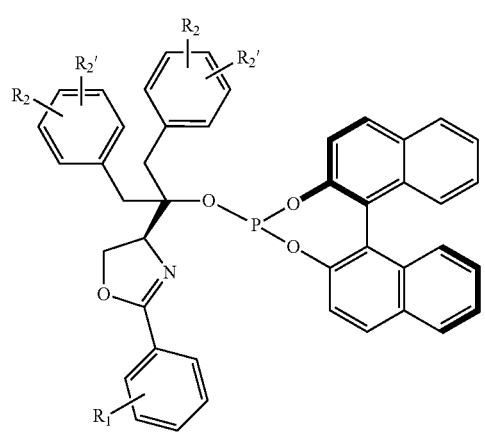

[Formula 2b]

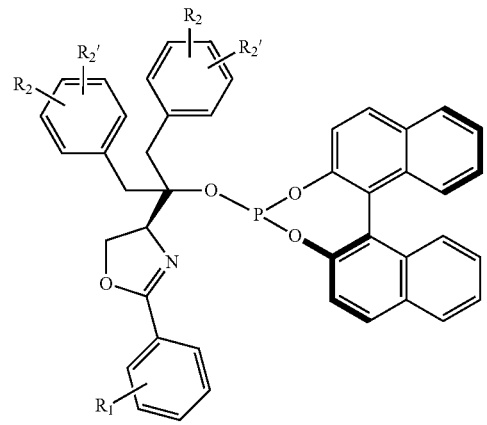

In Formulas 2a and 2b above, $R_1$, $R_2$ and $R_2'$ may be the same as $R_1$, $R_2$ and $R_2'$ in Formula 1, respectively.

In Formulas 2a and 2b above, the dotted wedge, solid wedge and thick lines depict the three-dimensional positions of the atomic groups of the compound as defined above.

According to one embodiment of the present invention, the enantiomeric compound represented by Formula 2a may be any one of the following compounds:

<Compound 2a-1>

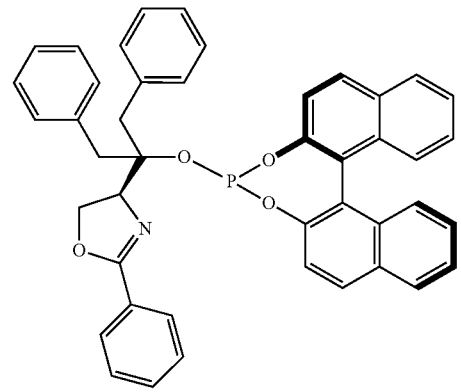

<Compound 2a-2>

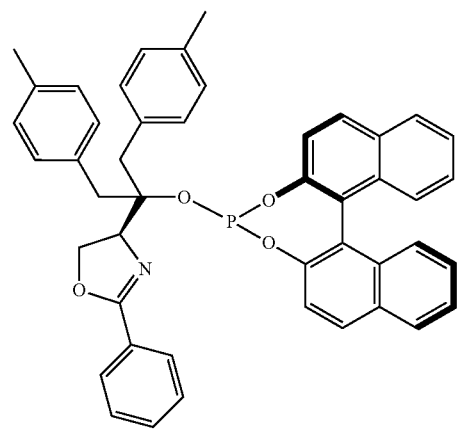

<Compound 2a-3>

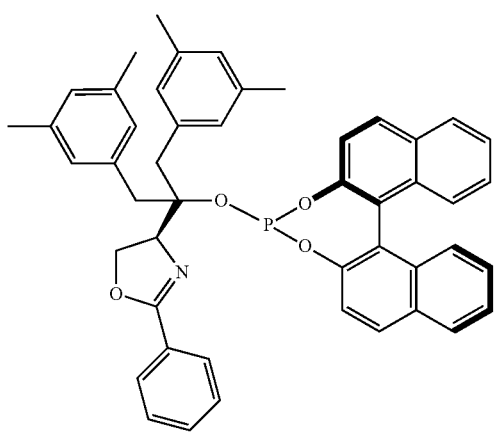

<Compound 2a-4>

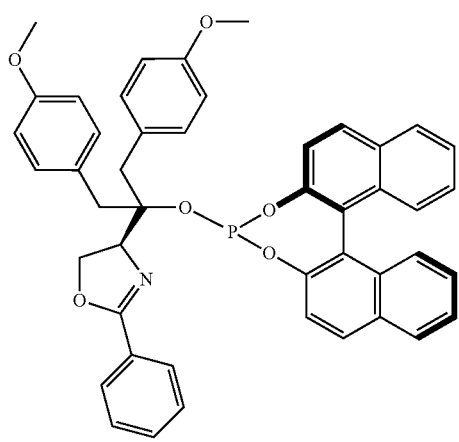

<Compound 2a-5>

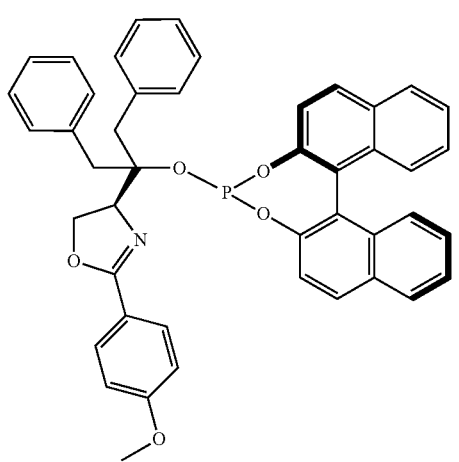

<Compound 2a-6>

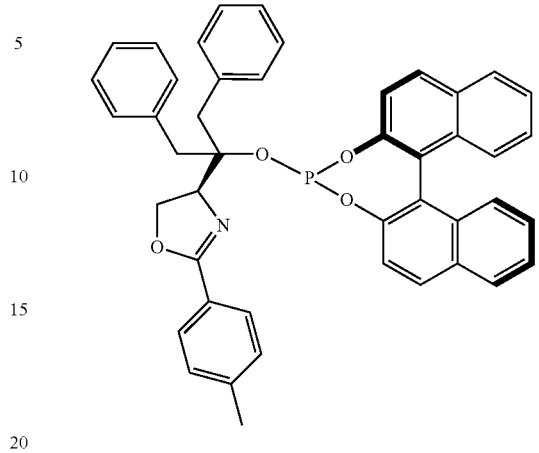

<Compound 2a-7>

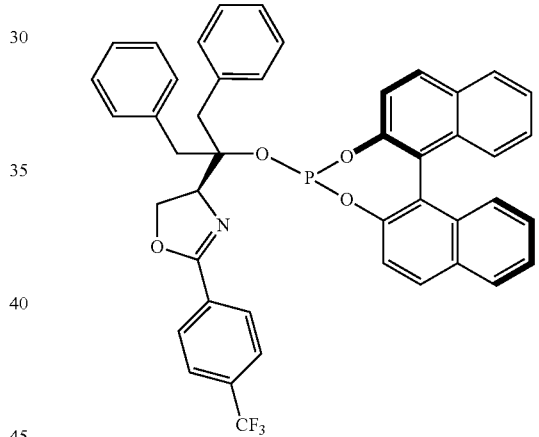

According to one embodiment of the present invention, the use of a catalyst for asymmetric hydrogenation including at least one of the ligands represented by Compounds 2a-1 to 2a-7 is capable of optically resolving (R)-enantiomer with excellent enantioselectivity from a carbon-carbon double bond-containing compound. In addition, the catalyst for asymmetric hydrogenation makes it possible to obtain (R)-enantiomer in high yield from a carbon-carbon double bond-containing compound even when the catalyst is used in small amounts as described below.

According to one embodiment of the present invention, the enantiomeric compound represented by Formula 2b may be any one of the following compounds:

<Compound 2b-1>
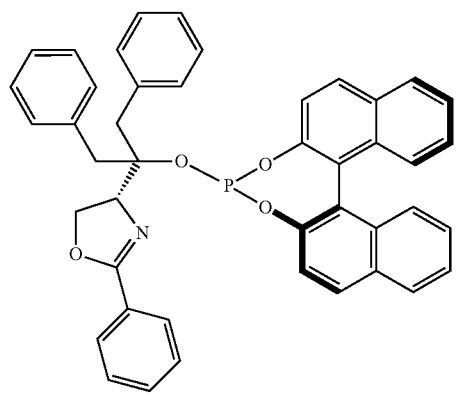
<Compound 2b-2>
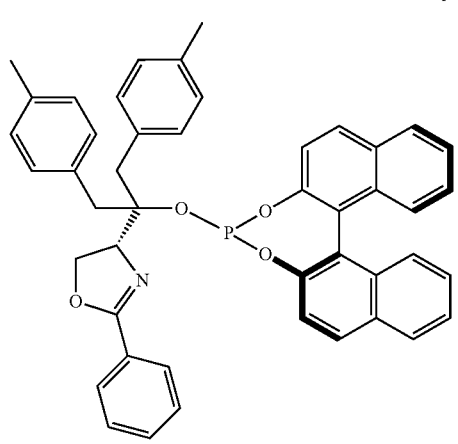
<Compound 2b-3>
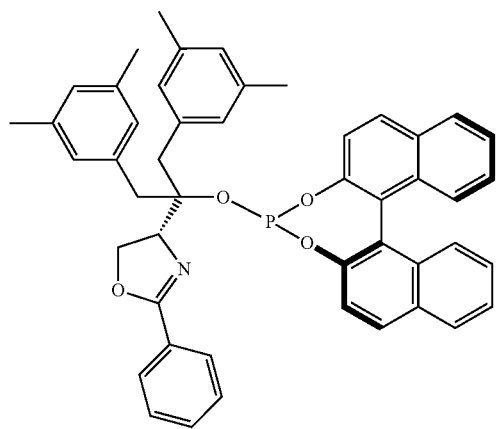
<Compound 2b-4>
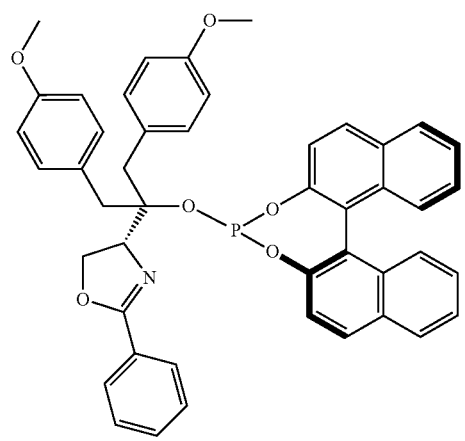
<Compound 2b-5>
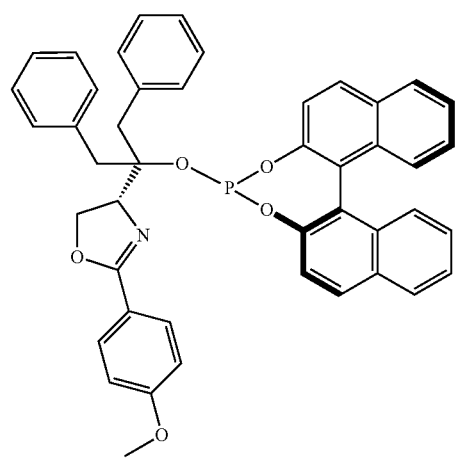
<Compound 2b-6>
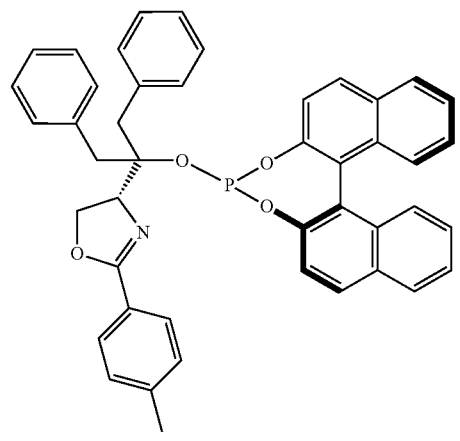

-continued

<Compound 2b-7>

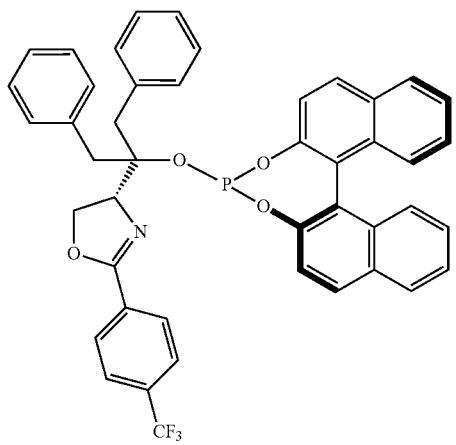

According to one embodiment of the present invention, the use of a catalyst for asymmetric hydrogenation including at least one of the ligands represented by Compounds 2b-1 to 2b-7 is capable of optically resolving a (S)-enantiomer with excellent enantioselectivity from a carbon-carbon double bond-containing compound. In addition, the catalyst for asymmetric hydrogenation makes it possible to obtain a (S)-enantiomer in high yield from a carbon-carbon double bond-containing compound even when the catalyst is used in small amounts as described below.

According to one embodiment of the present invention, the catalyst for asymmetric hydrogenation may further include, in addition to the ligand represented by Formula 1, an additional ligand that may be coordinated to the iridium cation. Specifically, the additional ligand may be cycloocta-1,5-diene.

According to one embodiment of the present invention, the catalyst for asymmetric hydrogenation may include a complex of the following Formula 3:

[Formula 3]

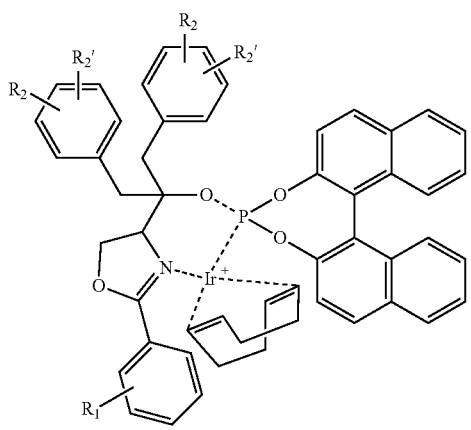

wherein $R_1$, $R_2$ and $R_2'$ may be the same as $R_1$, $R_2$ and $R_2'$ in Formula 1 above, respectively.

According to one embodiment of the present invention, in the complex represented by Formula 3, the P atom and N atom of the ligand represented by Formula 1 may form coordination bonds with the iridium cation. In addition, in the complex represented by Formula 3, the double bond of cycloocta-1,5-diene may form a coordination bond with the iridium cation.

According to one embodiment of the present invention, the catalyst for asymmetric hydrogenation including the complex represented by Formula 3 may more stably perform asymmetric hydrogenation. Specifically, the catalyst for asymmetric hydrogenation including the complex represented by Formula 3 may optically resolve (R)-enantiomer or (S)-enantiomer with excellent enantioselectivity from a carbon-carbon double bond-containing compound in a more stable manner.

According to one embodiment of the present invention, the complex represented by Formula 3 may be any one of the following compounds:

<Compound 3a-1>

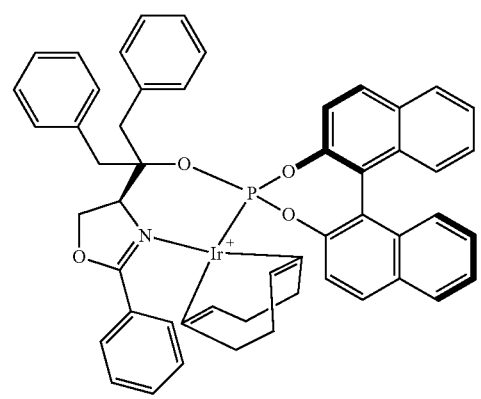

<Compound 3a-2>

<Compound 3a-3>
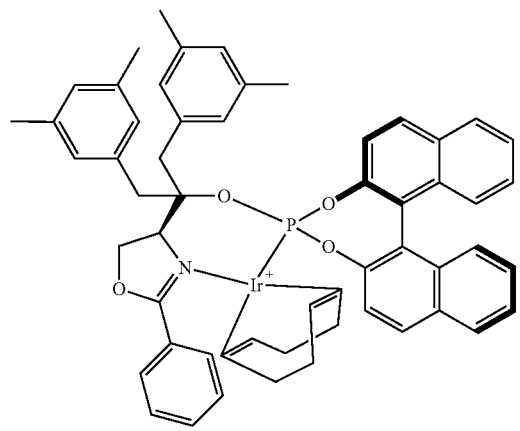
<Compound 3a-4>
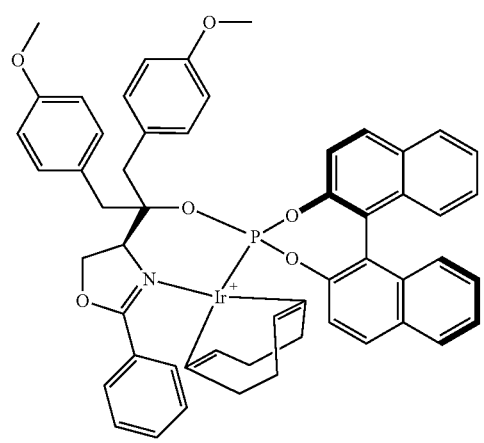
<Compound 3a-5>
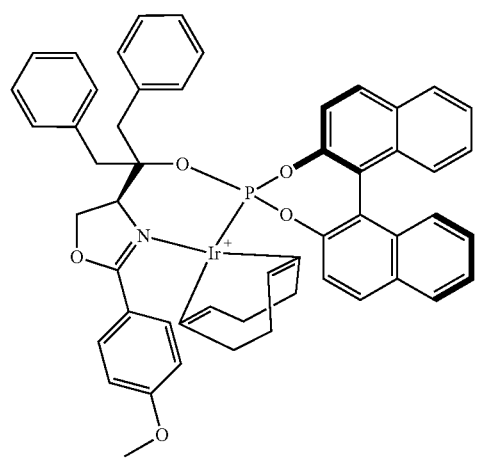
<Compound 3a-6>
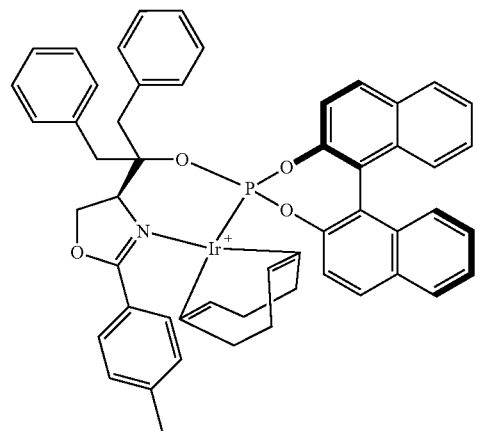
<Compound 3a-7>
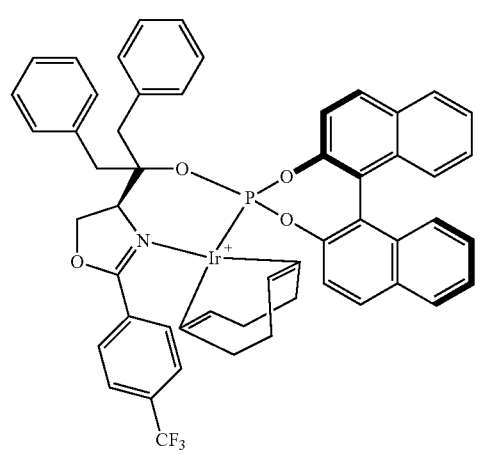
According to one embodiment of the present invention, the complex represented by Formula 3 may be any one of the following compounds:
<Compound 3b-1>
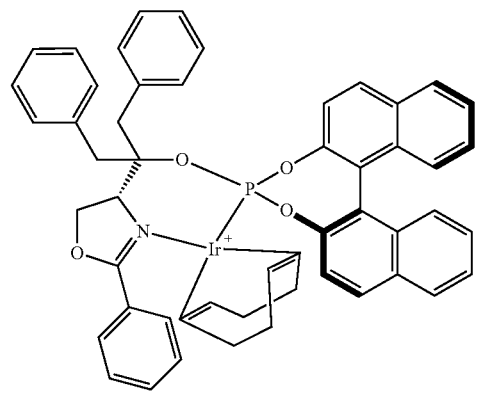

<Compound 3b-2>

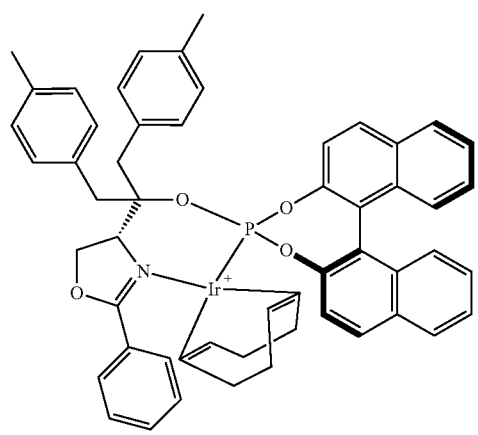

<Compound 3b-3>

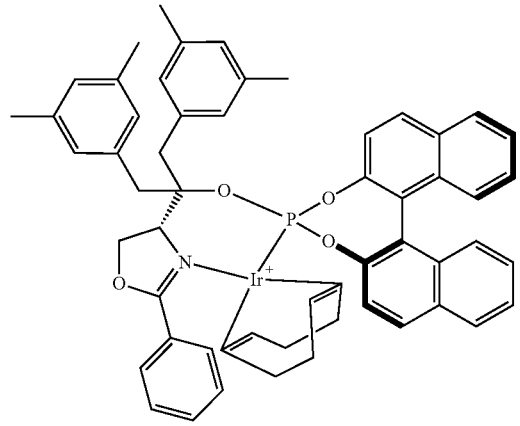

<Compound 3b-4>

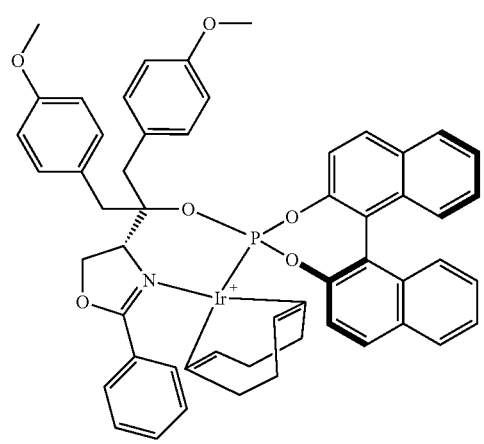

<Compound 3b-5>

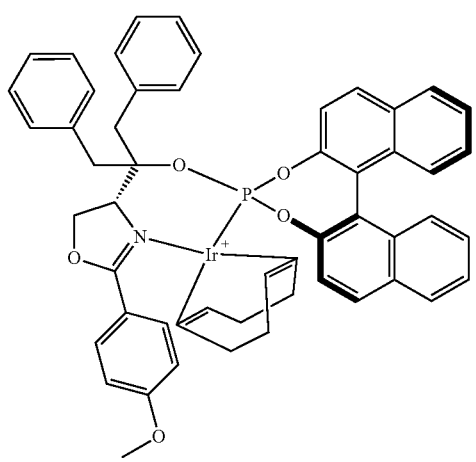

<Compound 3b-6>

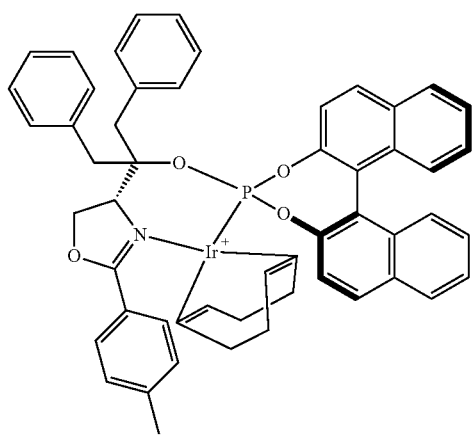

<Compound 3b-7>

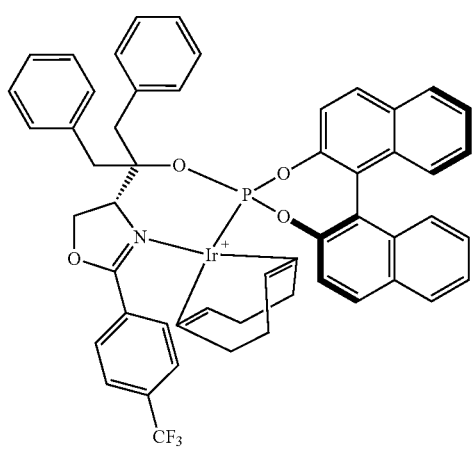

According to one embodiment of the present invention, the catalyst for asymmetric hydrogenation may include a coordinating anion.

According to one embodiment of the present invention, the catalyst for asymmetric hydrogenation may further include a coordinating anion of the following Formula 4:

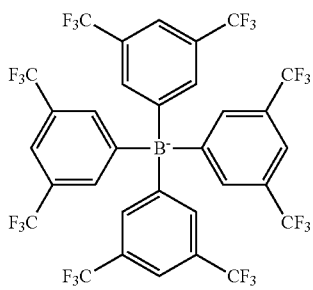

[Formula 4]

That is, the catalyst for asymmetric hydrogenation may include a compound represented by the following Formula 5:

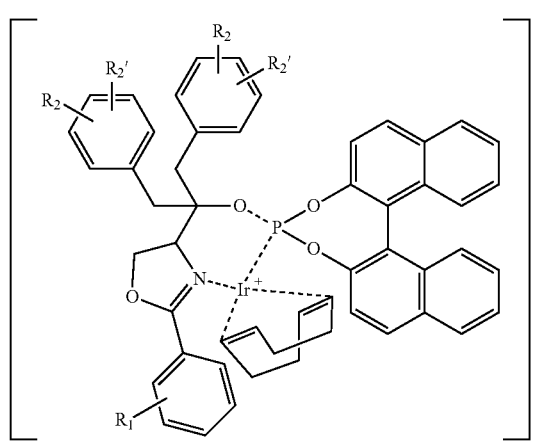

[Formula 5]

wherein $R_1$, $R_2$ and $R_2'$ may be the same as $R_1$, $R_2$ and $R_2'$ in Formula 1 above, respectively.

According to one embodiment of the present invention, the compound represented by Formula 5 may be a compound represented by the following Formula 5a:

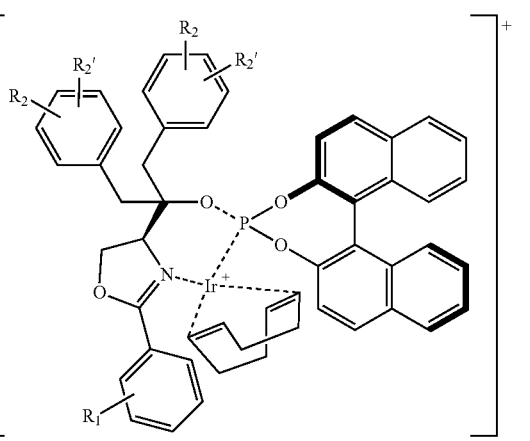

[Formula 5a]

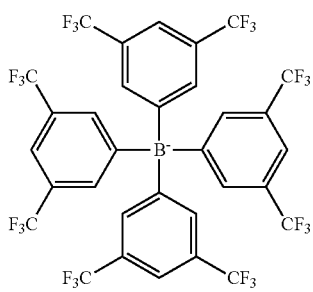

wherein $R_1$, $R_2$ and $R_2'$ may be the same as $R_1$, $R_2$ and $R_2'$ in Formula 5 above, respectively.

According to one embodiment of the present invention, the compound represented by Formula 5a may be any one of the following compounds:

<Compound 5a-1>

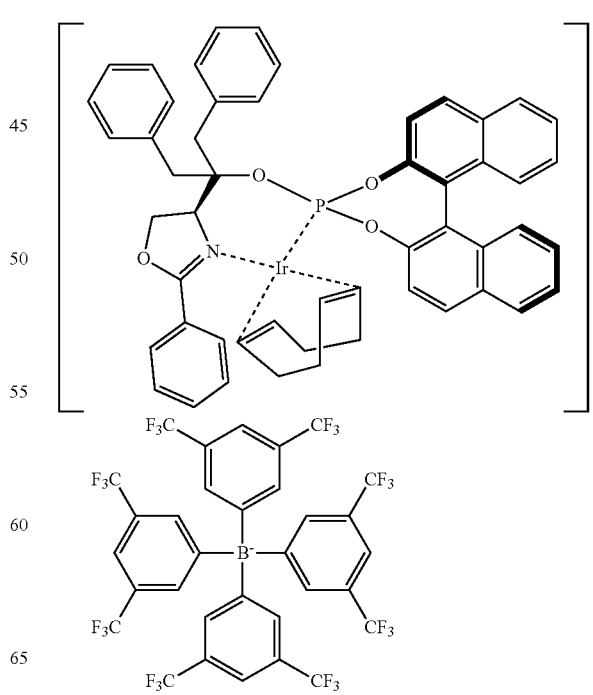

<Compound 5a-2>
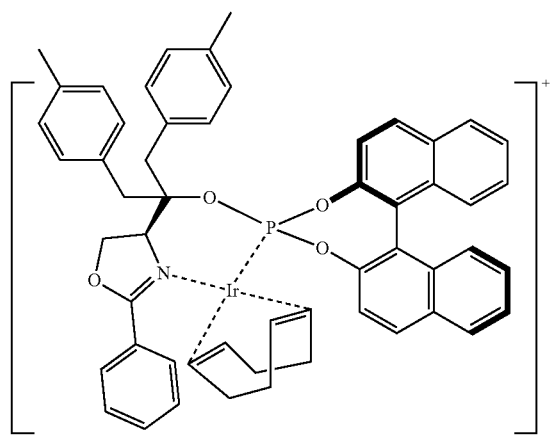
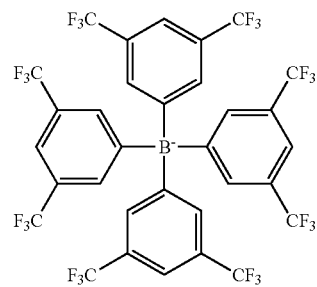
<Compound 5a-3>
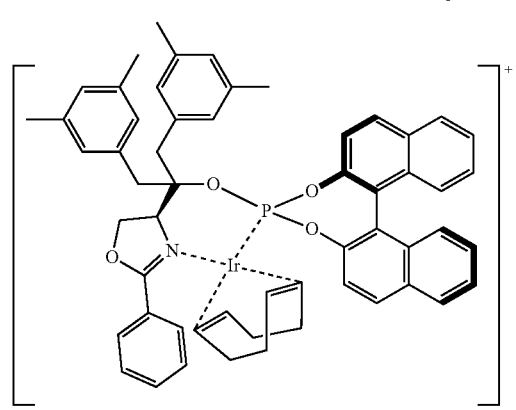
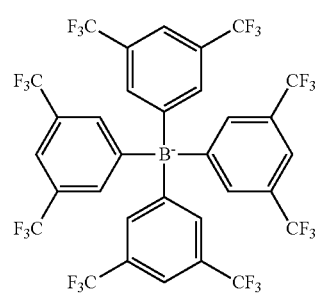
<Compound 5a-4>
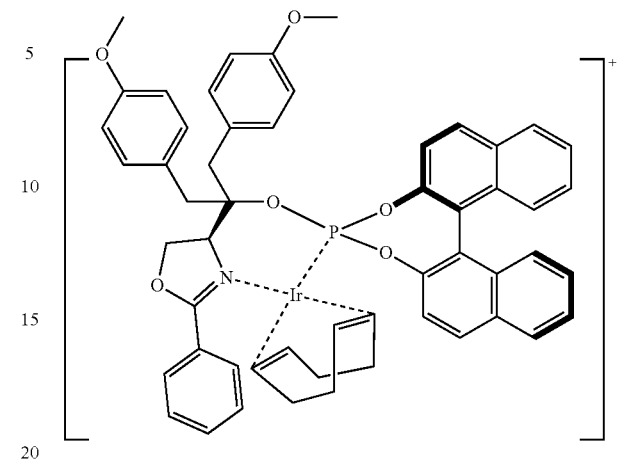
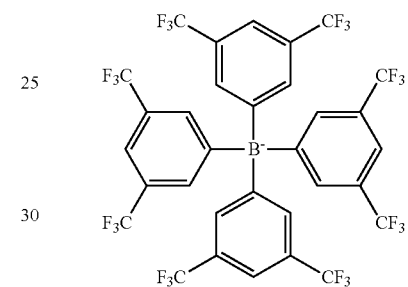
<Compound 5a-5>
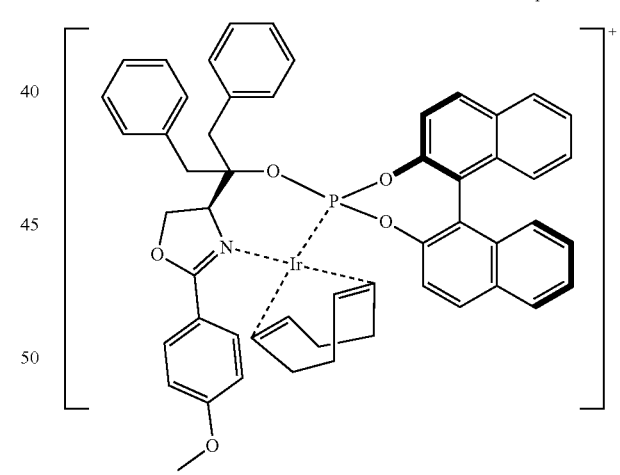
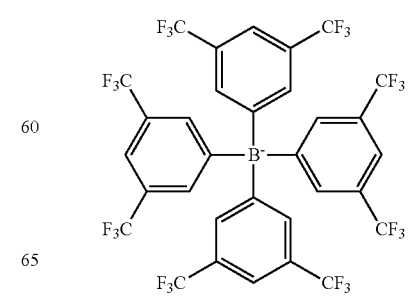

-continued

<Compound 5a-6>

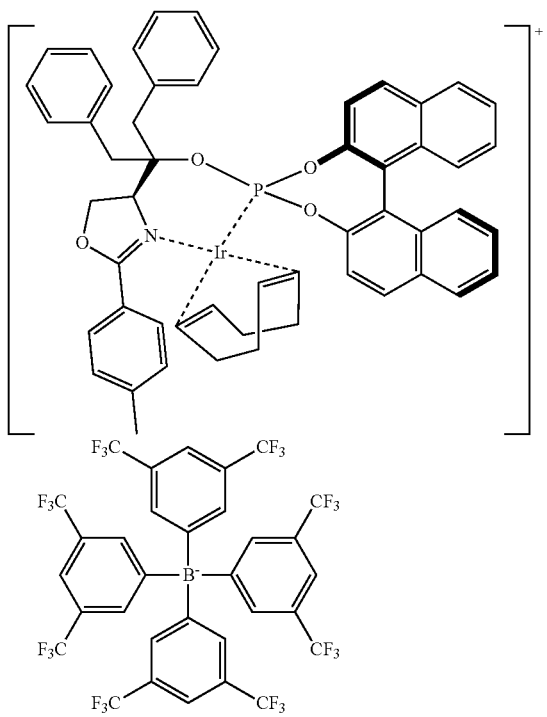

<Compound 5a-7>

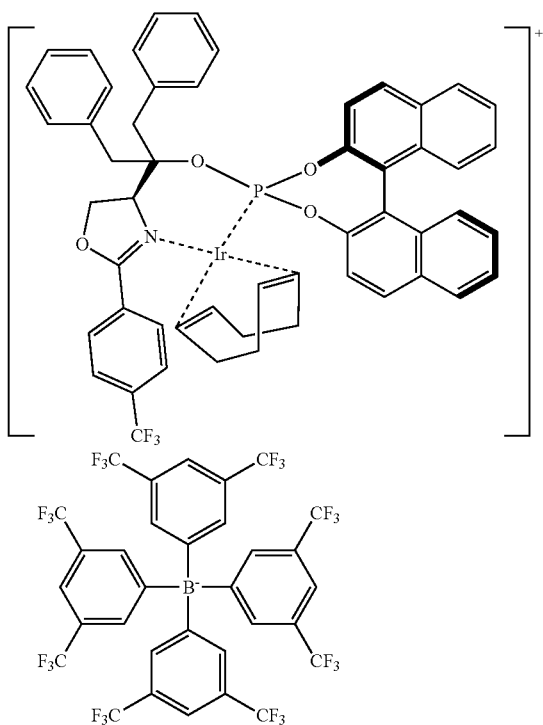

According to one embodiment of the present invention, the use of the catalyst for asymmetric hydrogenation including at least one of the compounds represented by Compounds 5a-1 to 5a-7 is capable of optically resolving (R)-enantiomer with excellent enantioselectivity. In addition, the catalyst for asymmetric hydrogenation makes it possible to obtain (R)-enantiomer in high yield from a carbon-carbon double bond-containing compound even when the catalyst is used in small amounts as described below.

In addition, according to one embodiment of the present invention, the compound represented by Formula 5 may be a compound represented by the following Formula 5b:

[Formula 5b]

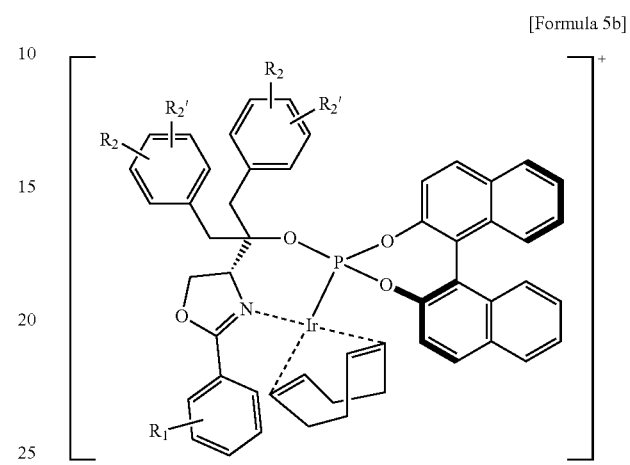

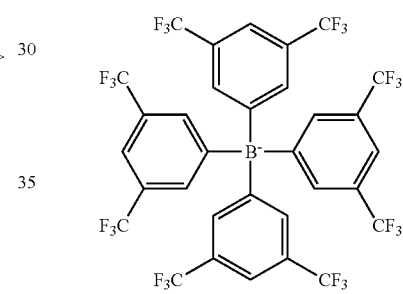

wherein $R_1$, $R_2$ and $R_2'$ may be the same as $R_1$, $R_2$ and $R_2'$ in Formula 5 above, respectively.

According to one embodiment of the present invention, the compound represented by Formula 5b may be any one of the following compounds:

<Compound 5b-1>

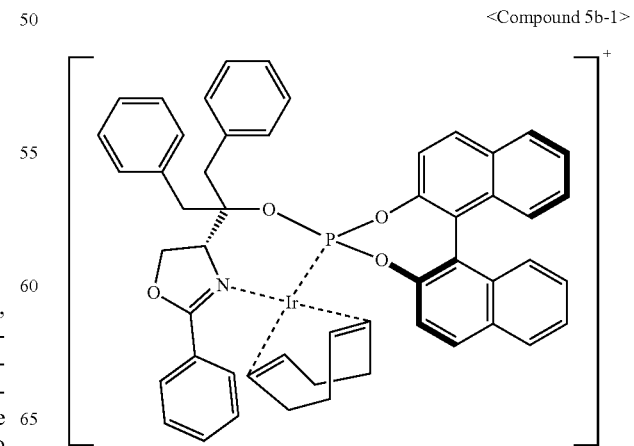

23
-continued
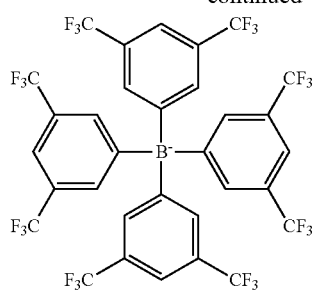
<Compound 5b-2>
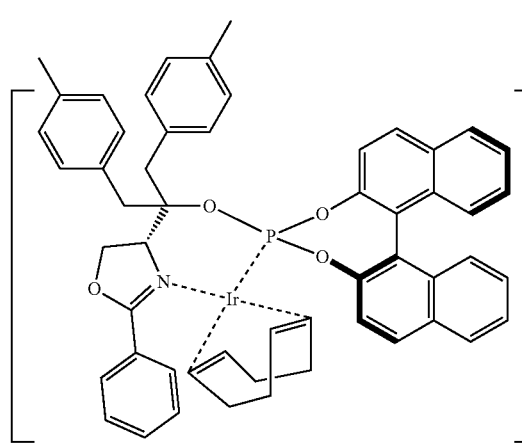
24
-continued
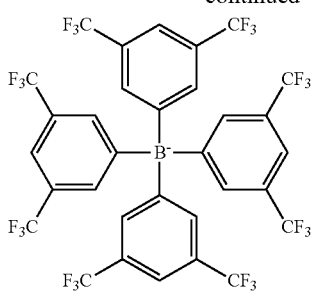
<Compound 5b-4>
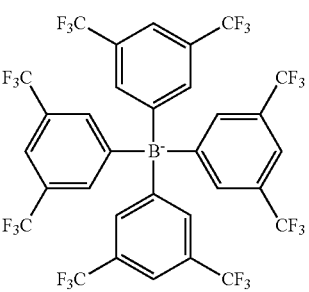
<Compound 5b-3>
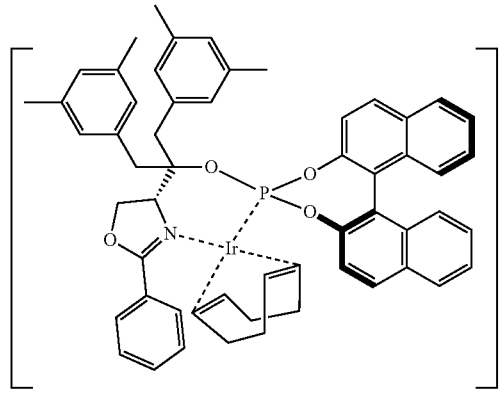
<Compound 5b-5>
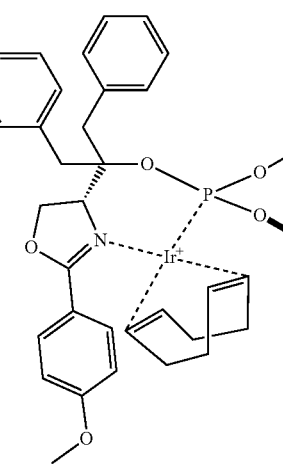

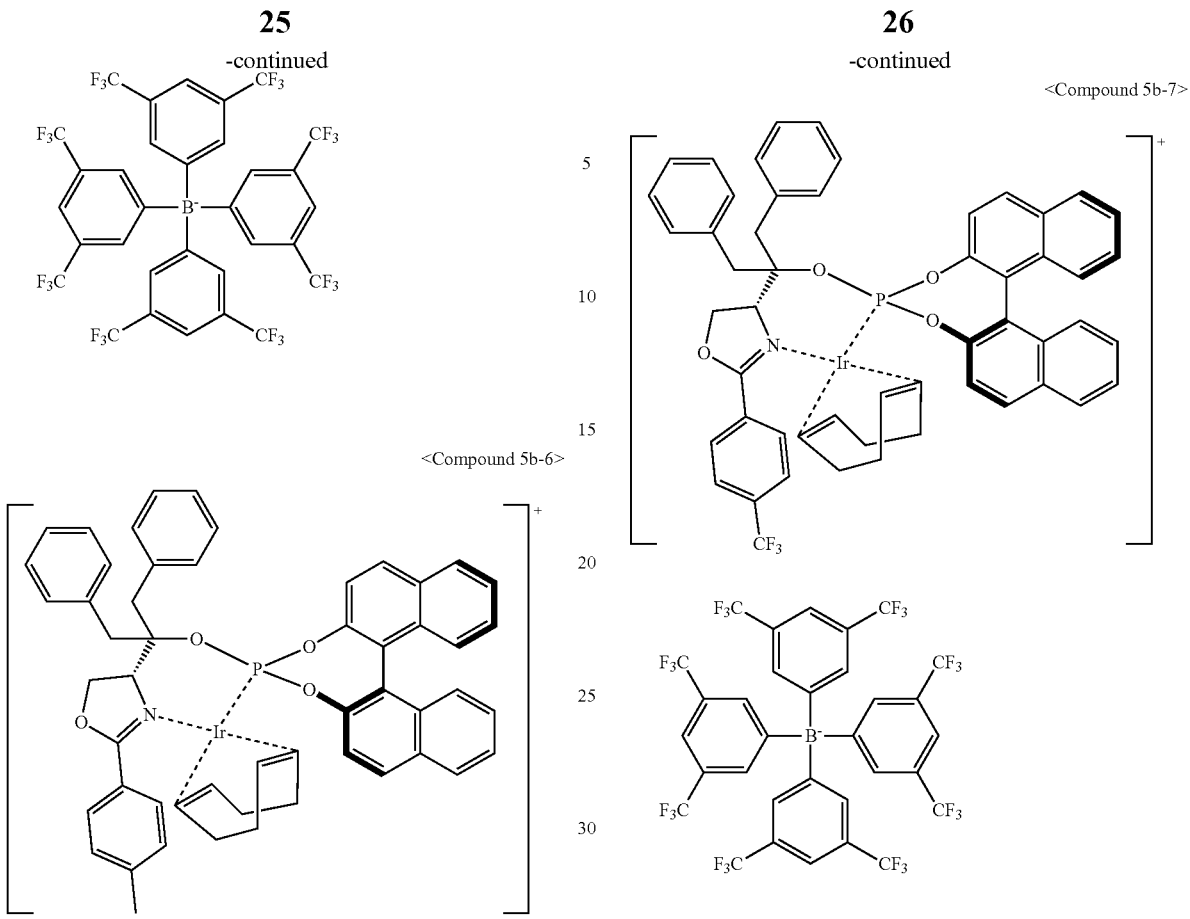

<Compound 5b-6>

<Compound 5b-7>

According to one embodiment of the present invention, the use of the catalyst for asymmetric hydrogenation including at least one of the compounds represented by Compounds 5b-1 to 5b-7 is capable of optically resolving (S)-enantiomer with excellent enantioselectivity from a carbon-carbon double bond-containing compound. In addition, the catalyst for asymmetric hydrogenation makes it possible to obtain (S)-enantiomer in high yield from a carbon-carbon double bond-containing compound even when the catalyst is used in small amounts as described below.

According to one embodiment of the present invention, the compound of Formula 5a may be produced according to the following Reaction Scheme 1a:

[Reaction Scheme 1a]

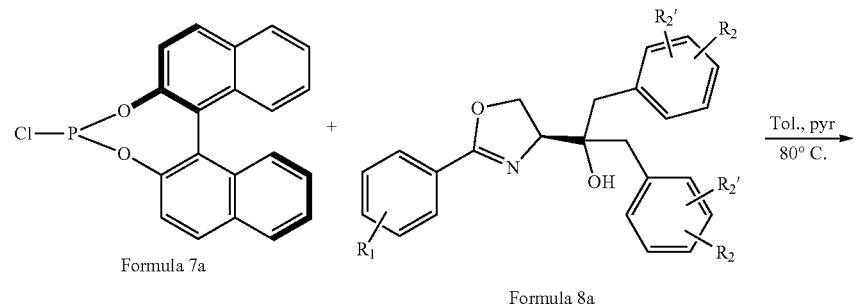

Formula 7a

Formula 8a

-continued
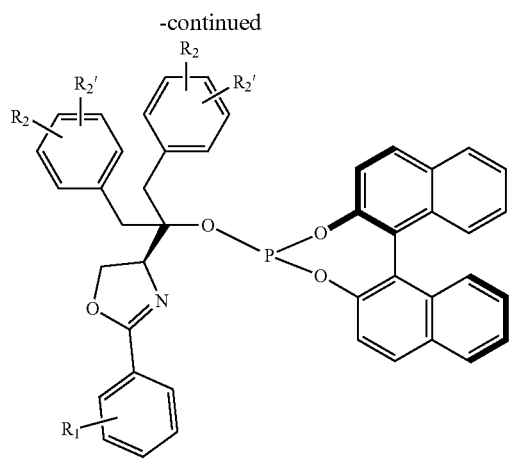
Formula 2a
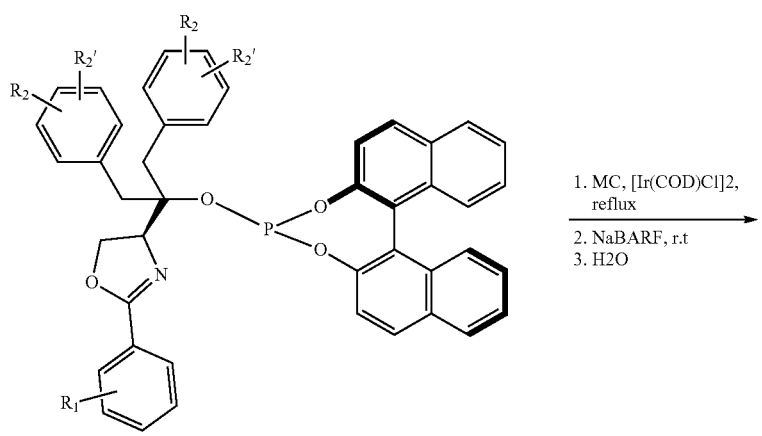
Formula 2a
1. MC, [Ir(COD)Cl]2, reflux
2. NaBARF, r.t
3. H2O
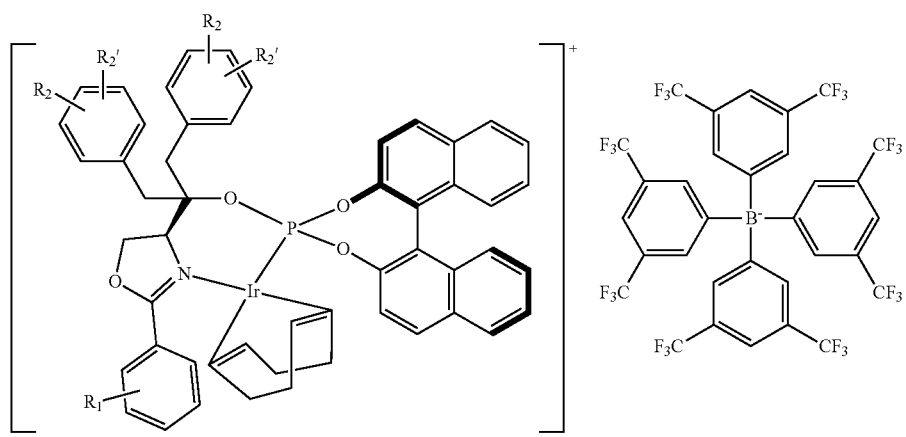
Formula 5a According to one embodiment of the present invention, the compound of Formula 5b may be produced according to the following Reaction Scheme 1b:
[Reaction Scheme 1b]
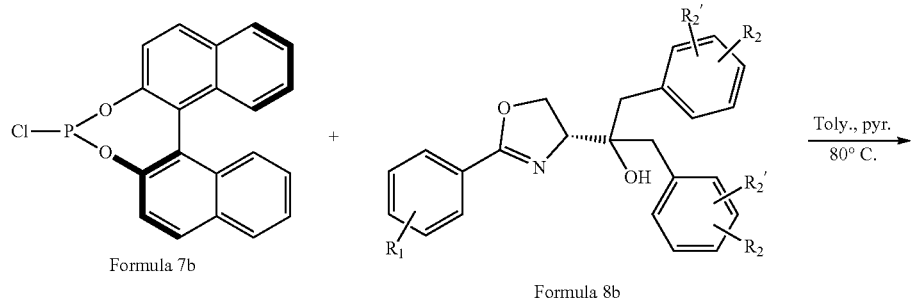
Formula 7b + Formula 8b →(Toly., pyr. 80° C.)
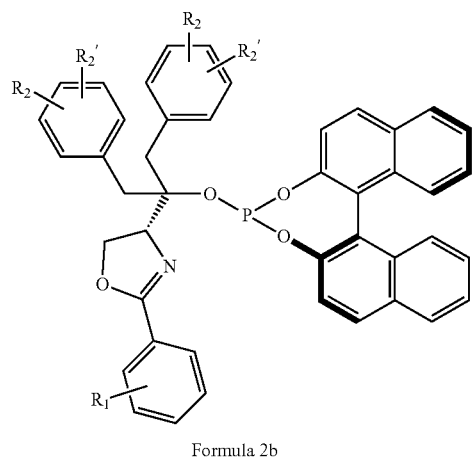
Formula 2b
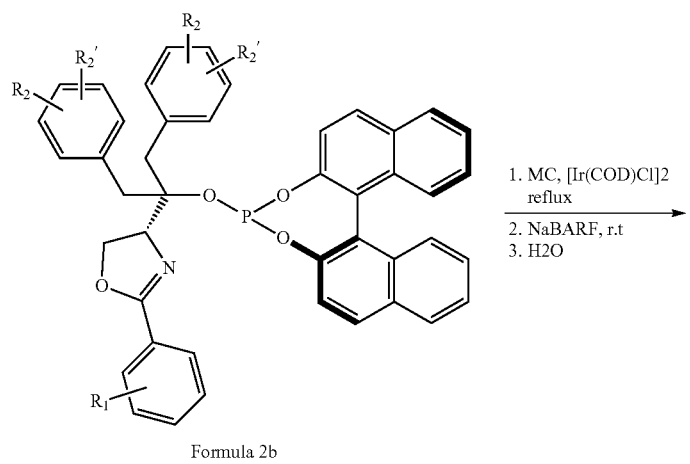
Formula 2b
1. MC, [Ir(COD)Cl]2 reflux
2. NaBARF, r.t
3. H2O

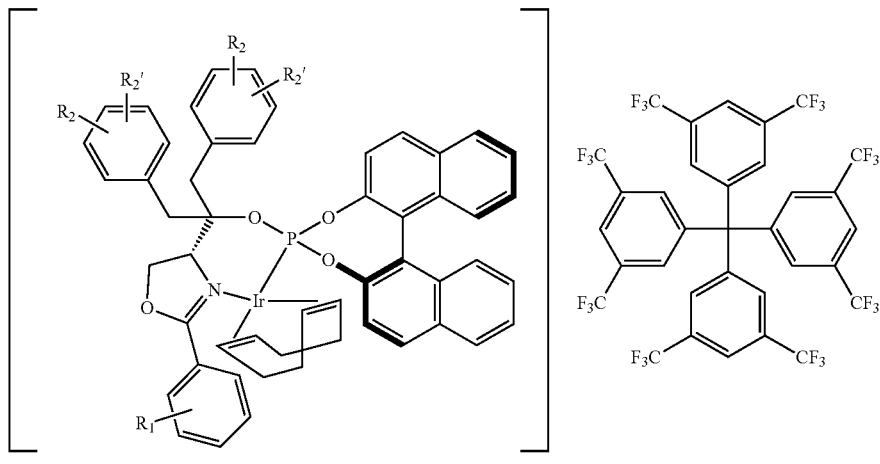

Formula 5b

However, the methods for producing the compounds of Formulas 5a and 5b are not limited thereto, and the compounds of Formulas 5a and 5b may be produced by any methods used in the art.

According to one embodiment of the present invention, the carbon-carbon double bond-containing compound may be a prochiral compound. Specifically, the use of the catalyst for asymmetric hydrogenation makes it possible to obtain (R)-enantiomer and (S)-enantiomer with high enantioselectivity from a carbon-carbon double bond-containing prochiral compound, for example, a prochiral olefinic compound. In addition, the catalyst for asymmetric hydrogenation makes it possible to obtain (R)-enantiomer and (S)-enantiomer in high yield from a prochiral olefinic compound even when the catalyst is used in relatively small amounts.

According to one embodiment of the present invention, the carbon-carbon double bond-containing compound may be a compound represented by the following Formula 6:

[Formula 6]

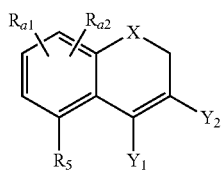

wherein

X is oxygen (O) or carbon (C);

$R_{a1}$ and $R_{a2}$ are each independently a hydrogen atom, a substituted or unsubstituted alkyl group having 1 to 3 carbon atoms, a substituted or unsubstituted alkoxy group having 1 to 3 carbon atoms, or a substituted or unsubstituted aryloxy group or aralkyloxy group having 6 to 15 carbon atoms, or $R_{a1}$ and $R_{a2}$ together form a substituted or unsubstituted cyclic or heterocyclic group having 4 to 10 carbon atoms;

$R_5$ is a hydrogen atom or a $C_1$-$C_2$ alkyl group or a $C_1$-$C_2$ alkoxy group;

$Y_1$ and $Y_2$ are different from each other and are each independently a hydrogen atom, a substituted alkyl group having 1 to 3 carbon atoms, a substituted alkoxy group having 1 to 3 carbon atoms, or a

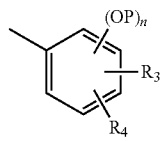

group, wherein $R_3$ and $R_4$ are each independently a hydrogen atom, a hydroxyl group, a substituted or unsubstituted, straight or branched $C_1$-$C_6$ alkyl group, a halogen atom, a substituted or unsubstituted, straight or branched $C_1$-$C_6$ alkoxy group, a substituted or unsubstituted, straight or branched $C_1$-$C_4$ thioalkyl group, a substituted or unsubstituted allyloxy group, or a substituted or unsubstituted aryloxy group;

P represents a protecting group of a substituted or unsubstituted, straight or branched $C_1$-$C_4$ alkyl group, a substituted or unsubstituted benzyl group, a substituted or unsubstituted allyl group, a t-butyldimethylsilyl group, a t-butyldiphenylsilyl group, a methylphenylsilyl group, a trimethylphenylsilyl group, $MeSO_2$, or p-$TsSO_2$;

n is 1 to 3;

when OP is plural in number, they may be the same or different; and the substituent in the substituted alkyl group, substituted alkoxy group, substituted thioalkyl group, substituted aryloxy group, substituted aralkyloxy group, substituted cyclic group and substituted heterocyclic group is a halogen atom, a straight or branched $C_1$-$C_5$ alkyl group, a straight or branched $C_1$-$C_5$ alkoxy group, or a straight or branched $C_1$-$C_3$ thioalkyl group.

According to one embodiment of the present invention, in Formula 6 above, X may be O;

$R_{a1}$ and $R_{a2}$ may together form a substituted or unsubstituted heterocyclic group having 4 to 10 carbon atoms;

$Y_1$ may be a hydrogen atom;

and $Y_2$ may be a

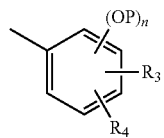

group, wherein $R_3$, $R_4$, P and n are as defined above.

According to one embodiment of the present invention, the carbon-carbon double bond-containing compound may be a compound represented by the following Formula 7:

[Formula 7]

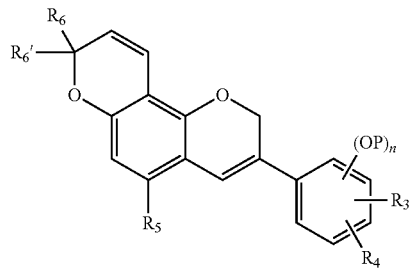

wherein $R_3$ and $R_4$ are each independently a hydrogen atom, a hydroxyl group, a substituted or unsubstituted, straight or branched $C_1$-$C_6$ alkyl group, a halogen atom, a substituted or unsubstituted, straight or branched $C_1$-$C_6$ alkoxy group; a substituted or unsubstituted, straight or branched $C_1$-$C_4$ thioalkyl group; a substituted or unsubstituted allyloxy group, or a substituted or unsubstituted aryloxy group;

$R_5$ is a hydrogen atom, a $C_1$-$C_2$ alkyl group or a $C_1$-$C_2$ alkoxy group;

$R_6$ and $R_6'$ are each independently a hydrogen atom or a $C_1$-$C_6$ alkyl group;

P represents a protecting group of a substituted or unsubstituted, straight or branched $C_1$-$C_4$ alkyl group, a substituted or unsubstituted benzyl group, a substituted or unsubstituted allyl group, a t-butyldimethylsilyl group, a t-butyldiphenylsilyl group, a methylphenylsilyl group, a trimethylphenylsilyl group, $MeSO_2$, or p-$TsSO_2$;

n is 1 to 3;

when OP is plural in number, they are the same or different; and the substituent in the substituted alkyl group, substituted alkoxy group and substituted thioalkyl group is a halogen atom, a straight or branched $C_1$-$C_5$ alkyl group, a straight or branched $C_1$-$C_5$ alkoxy group, or a straight or branched $C_1$-$C_3$ thioalkyl group.

According to one embodiment of the present invention, the catalyst for asymmetric hydrogenation of the carbon-carbon double bond-containing compound is capable of effectively and optically resolving (R)-enantiomer and (S)-enantiomer with high enantioselectivity from the compound represented by Formula 7.

In addition, the catalyst for asymmetric hydrogenation makes it possible to obtain (R)-enantiomer and (S)-enantiomer in high yield from the compound represented by Formula 7 even when the catalyst is used in relatively small amounts.

MODE FOR INVENTION

Hereinafter, the present invention will be described in more detail with reference to the following examples. However, these examples are merely to help understand the present invention, and the scope of the present invention is not limited by these examples in any way.

Unless otherwise indicated, reagents purchased from Sigma-Aldrich (USA) were used in the following examples.

The full names of indicated abbreviations of the reagents used in the following examples and comparative examples are as follows:

$[Ir(COD)Cl]_2$: Bis(1,5-cyclooctadiene)diiridium(I) dichloride;

NaBArF: sodium tetrakis(3,5-bis(trifluoromethyl)phenyl) borate.

Example 1: Synthesis of [(2-((S)-4,5-dihydro-2-phenyloxazol-4-yl)-1,3-diphenylpropan-2-yl)(((S)-1,1'-binaphthalene)-2,2'-diyl)phosphite)](1,5-COD) iridium(I) tetrakis(3,5-bis(trifluoromethyl)phenyl) borate Catalyst (Compound 5a-1)

1-1. Synthesis of 2-((S)-4,5-dihydro-2-phenyloxazol-4-yl)-1,3-diphenylpropan-2-ol 132.6 g (0.877 mol) of benzylmagnesium chloride was added to 400 ml of tetrahydrofuran and cooled to 0° C., and then a solution of 40 g (0.195 mol) of (S)-methyl 4,5-dihydro-2-phenyloxazole-4-carboxylate in 100 ml of tetrahydrofuran was added thereto at the same temperature, followed by stirring at the same temperature for 30 minutes. After completion of the reaction, 40 ml of purified water was added to the reaction solution, followed by vigorous stirring for 1 hour. After stirring, the solid was filtered and the filtrate was concentrated. The concentrate was purified by column chromatography to obtain 29.3 g (42.0% yield) of 2-((S)-4,5-dihydro-2-phenyloxazol-4-yl)-1,3-diphenylpropan-2-ol.

$^1$H-NMR (CDCl$_3$): 7.99-7.21 (m, 15H, aromatic H), 4.44-4.39 (t, 1H, oxazoline ring CH2), 4.30-4.19 (m, 2H, oxazoline ring CH, oxazoline ring CH2), 3.04-3.01 (d, 1H, benzyl CH2), 2.88 (d, 2H, benzyl CH2), 2.71-2.67 (d, 1H, benzyl CH2), 1.93 (s, 1H, —OH).

1-2. Synthesis of (2-((S)-4,5-dihydro-2-phenyloxazol-4-yl)-1,3-diphenylpropan-2-yl)(((S)-1,1'-binaphthalene)-2,2'-diyl)phosphite 29.3 g (0.082 mol) of 2-((S)-4,5-dihydro-2-phenyloxazol-4-yl)-1,3-diphenylpropan-2-ol produced in Example 1-1 above and 32.4 g (0.41 mol) of pyridine were added to 80 ml of toluene and stirred at room temperature for 20 minutes.

Then, 48.8 g (0.139 mol) of (S)-1,1'-binaphthyl-2,2'-dioxychlorophosphine and 55.0 g (0.695 mol) of pyridine were added to 160 ml of toluene and stirred at room temperature for 20 minutes. The two reaction solutions were mixed with each other and stirred under reflux for 13 hours. After completion of the reaction, the reaction solution was concentrated and purified by column chromatography to obtain 37.5 g (68.2% yield) of (2-((S)-4,5-dihydro-2-phenyloxazol-4-yl)-1,3-diphenylpropan-2-yl)(((S)-1,1'-binaphthalene)-2,2'-diyl)phosphite.

$^1$H-NMR (CDCl$_3$): 8.06-7.02 (m, 27H, aromatic H), 4.49-4.44 (t, 1H, oxazoline ring CH), 4.13-4.10 (dd, 2H, oxazoline ring CH2), 3.81-3.76 (d, 1H, benzyl CH2), 3.20-3.17 (d, 1H, benzyl CH2), 3.08-2.98 (dd, 2H, benzyl CH2);

$^{13}$C-NMR (CDCl$_3$): 165, 148.31, 148.29, 136.50, 135.80, 131.41, 131.35, 131.16, 131.12, 130.98, 129.99, 129.41, 128.52, 128.34, 128.27, 128.04, 127.98, 127.81, 126.94, 126.68, 126.06, 125.91, 124.76, 124.64, 124.30, 124.28, 123.95, 123.01, 122.50, 121.96, 86.13, 71.33, 68.13, 43.63, 43.55.

1-3. Synthesis of [(2-((S)-4,5-dihydro-2-phenyloxazol-4-yl)-1,3-diphenylpropan-2-yl)(((S)-1,1'-binaphthalene)-2,2'-diyl) phosphite)](1,5-COD)iridium(I) tetrakis(3,5-bis(trifluoromethyl)phenyl)borate (Compound 5a-1)

10.0 g (14.88 mmol) of (2-((S)-4,5-dihydro-2-phenyloxazol-4-yl)-1,3-diphenylpropan-2-yl)(((S)-1,1'-binaphthalene)-2,2'-diyl)phosphite produced in Example 1-2 above and 5.0 g (7.44 mmol) of [Ir(COD)Cl]2 were added to 500 ml of dichloromethane, stirred under reflux for 1 hour, and then cooled to room temperature. 14.5 g (16.31 mmol) of NaBArF was added to the reaction solution, followed by stirring at room temperature for 20 minutes. After completion of the reaction, 500 ml of purified water was added to the reaction solution, and the organic layer was collected by layer separation. Magnesium sulfate anhydrous was added into the organic layer with stirring, followed by filtration to remove solids. This step was further performed twice, and then the filtrate was concentrated and dried under a high vacuum to obtain 24.7 g (90.4% yield) of [(2-((S)-4,5-dihydro-2-phenyloxazol-4-yl)-1,3-diphenylpropan-2-yl)(((S)-1,1'-binaphthalene)-2,2'-diyl)phosphite)](1,5-COD)iridium(I) tetrakis(3,5-bis(trifluoromethyl)phenyl)borate (Compound 5a-1).

Example 2: Synthesis of [(2-((R)-4,5-dihydro-2-phenyloxazol-4-yl)-1,3-diphenylpropan-2-yl)(((R)-1,1'-binaphthalene)-2,2'-diyl)phosphite)](1,5-COD) iridium(I) tetrakis(3,5-bis(trifluoromethyl)phenyl) borate Catalyst (Compound 5b-1)

2-1. Synthesis of 2-((R)-4,5-dihydro-2-phenyloxazol-4-yl)-1,3-diphenylpropan-2-ol 2-((R)-4,5-dihydro-2-phenyloxazol-4-yl)-1,3-diphenylpropan-2-ol was obtained by performing the same method as Example 1-1 above, except that (R)-methyl 4,5-dihydro-2-phenyloxazole-4-carboxylate was used instead of (S)-methyl 4,5-dihydro-2-phenyloxazole-4-carboxylate.

$^1$H-NMR (CDCl$_3$): 7.99-7.20 (m, 15H, aromatic H), 4.36-4.32 (t, 1H, oxazoline ring CH2), 4.29-4.25 (t, H, oxazoline ring CH), 4.22-4.18 (dd, 1H, oxazoline ring CH2), 3.00-2.96 (d, 1H, benzyl CH2), 2.87 (s, 2H, benzyl CH2), 2.70-2.67 (d, 1H, benzyl CH2), 1.99 (s, 1H, —OH).

2-2. Synthesis of (2-((R)-4,5-dihydro-2-phenyloxazol-4-yl)-1,3-diphenylpropan-2-yl)(((R)-1,1'-binaphthalene)-2,2'-diyl)phosphite (2-((R)-4,5-dihydro-2-phenyloxazol-4-yl)-1,3-diphenylpropan-2-yl)(((R)-1,1'-binaphthalene)-2,2'-diyl)phosphite was obtained by performing the same method as Example 1-2 above, except that 2-((R)-4,5-dihydro-2-phenyloxazol-4-yl)-1,3-diphenylpropan-2-ol produced in Example 2-1 above was used instead of 2-((S)-4,5-dihydro-2-phenyloxazol-4-yl)-1,3-diphenylpropan-2-ol and that (R)-1,1'-binaphthyl-2,2'-dioxychlorophosphine was used instead of (S)-1,1'-binaphthyl-2,2'-dioxychlorophosphine.

$^1$H-NMR (CDCl$_3$): 8.05-7.01 (m, 27H, aromatic H), 4.48-4.44 (t, 1H, oxazoline ring CH), 4.05-3.97 (m, 2H, oxazoline ring CH2), 3.75-3.72 (d, 1H, benzyl CH2), 3.20-3.17 (d, 1H, benzyl CH2), 3.04-2.94 (dd, 2H, benzyl CH2).

2-3. Synthesis of [(2-((R)-4,5-dihydro-2-phenyloxazol-4-yl)-1,3-diphenylpropan-2-yl)(((R)-1,1'-binaphthalene)-2,2'-diyl)phosphite](1,5-COD)iridium(I) tetrakis(3,5-bis(trifluoromethyl)phenyl)borate (Compound 5b-1)

[(2-((R)-4,5-dihydro-2-phenyloxazol-4-yl)-1,3-diphenylpropan-2-yl)(((R)-1,1'-binaphthalene)-2,2'-diyl)phosphite](1,5-COD)iridium(I) tetrakis(3,5-bis(trifluoromethyl)phenyl)borate (Compound 5b-1) was obtained by performing the same method as Example 1-3 above, except that (2-((R)-4,5-dihydro-2-phenyloxazol-4-yl)-1,3-diphenylpropan-2-yl)(((R)-1,1'-binaphthalene)-2,2'-diyl)phosphite produced in Example 2-2 above was used instead of (2-((S)-4,5-dihydro-2-phenyloxazol-4-yl)-1,3-diphenylpropan-2-yl)(((S)-1,1'-binaphthalene)-2,2'-diyl)phosphite.

Example 3: Synthesis of [(2-((R)-4,5-dihydro-2-phenyloxazol-4-yl)-1,3-dip-tolylpropan-2-yl)(((R)-1,1'-binaphthalene)-2,2'-diyl)phosphite](1,5-COD) iridium(I) tetrakis(3,5-bis(trifluoromethyl)phenyl) borate Catalyst (Compound 5b-2)

3-1. Synthesis of 2-((R)-4,5-dihydro-2-phenyloxazol-4-yl)-1,3-dip-tolylpropan-2-ol 2-((R)-4,5-dihydro-2-phenyloxazol-4-yl)-1,3-dip-tolylpropan-2-ol was obtained by performing the same method as Example 1-1 above, except that 4-methylbenzylmagnesium chloride was used instead of benzylmagnesium chloride and that (R)-methyl 4,5-dihydro-2-phenyloxazole-4-carboxylate was used instead of (S)-methyl 4,5-dihydro-2-phenyloxazole-4-carboxylate.

$^1$H-NMR (CDCl$_3$): 7.98-7.07 (m, 13H, aromatic H), 4.37-4.33 (t, 1H, oxazoline ring CH), 4.29-4.20 (m, 2H, oxazoline ring CH2), 2.96-2.92 (d, 1H, benzyl CH2), 2.83 (d, 2H, benzyl CH2), 2.67-2.64 (d, 1H, benzyl CH2), 2.33 (s, 3H —CH3), 2.30 (s, 3H, —CH3), 1.91 (s, 1H, —OH);

$^{13}$C-NMR (CDCl$_3$): 164.45, 136.05, 136.01, 133.91, 133.75, 131.41, 130.82, 128.96, 128.43, 128.32, 127.81, 75.89, 72.13, 68.57, 41.90, 41.69, 21.11, 21.10.

3-2. Synthesis of (2-((R)-4,5-dihydro-2-phenyloxazol-4-yl)-1,3-dip-tolylpropan-2-yl)(((R)-1,1'-binaphthalene)-2,2'-diyl)phosphite (2-((R)-4,5-dihydro-2-phenyloxazol-4-yl)-1,3-dip-tolylpropan-2-yl)(((R)-1,1'-binaphthalene)-2,2'-diyl)phosphite was obtained by performing the same method as Example 1-2 above, except that 2-((R)-4,5-dihydro-2-phenyloxazol-4-yl)-1,3-dip-tolylpropan-2-ol produced in Example 3-1 above was used instead of 2-((S)-4,5-dihydro-2-phenyloxazol-4-yl)-1,3-diphenylpropan-2-ol and that (R)-1,1'-binaphthyl-2,2'-dioxychlorophosphine was used instead of (S)-1,1'-binaphthyl-2,2'-dioxychlorophosphine.

¹H-NMR (CDCl₃): 8.05-6.79 (m, 25H, aromatic H), 4.46-4.42 (t, 1H, oxazoline ring CH), 4.00-3.97 (m, 2H, oxazoline ring CH2), 3.73-3.70 (d, 1H, benzyl CH2), 3.19-3.15 (d, 1H, benzyl CH2), 2.98-2.90 (dd, 2H, benzyl CH2), 2.28 (s, 3H, —CH3), 2.26 (s, 3H, —CH3).

3-3. Synthesis of [(2-((R)-4,5-dihydro-2-phenyloxazol-4-yl)-1,3-dip-tolylpropan-2-yl)(((R)-1,1'-binaphthalene)-2,2'-diyl)phosphite](1,5-COD)iridium(I) tetrakis(3,5-bis(trifluoromethyl)phenyl)borate (Compound 5b-2)

[(2-((R)-4,5-dihydro-2-phenyloxazol-4-yl)-1,3-dip-tolylpropan-2-yl)(((R)-1,1'-binaphthalene)-2,2'-diyl)phosphite](1,5-COD)iridium(I) tetrakis(3,5-bis(trifluoromethyl)phenyl)borate (Compound 5b-2) was obtained by performing the same method as Example 1-3 above, except that (2-((R)-4,5-dihydro-2-phenyloxazol-4-yl)-1,3-dip-tolylpropan-2-yl)(((R)-1,1'-binaphthalene)-2,2'-diyl)phosphite produced in Example 3-2 above was used instead of (2-((S)-4,5-dihydro-2-phenyloxazol-4-yl)-1,3-diphenylpropan-2-yl)(((S)-1,1'-binaphthalene)-2,2'-diyl)phosphite.

Example 4: Synthesis of [(2-((S)-4,5-dihydro-2-phenyloxazol-4-yl)-1,3-bis(4-methoxyphenyl)propan-2-yl)(((S)-1,1'-binaphthalene)-2,2'-diyl)phosphite](1,5-COD)iridium(I) tetrakis(3,5-bis(trifluoromethyl)phenyl)borate Catalyst (Compound 5a-4)

4-1. Synthesis of 2-((S)-4,5-dihydro-2-phenyloxazol-4-yl)-1,3-bis(4-methoxyphenyl)propan-2-ol 2-((S)-4,5-dihydro-2-phenyloxazol-4-yl)-1,3-bis(4-methoxyphenyl)propan-2-ol was obtained by performing the same method as Example 1-1 above, except that 1-(4-methoxyphenyl)methylmagnesium chloride was used instead of benzylmagnesium chloride.

¹H-NMR (CDCl₃): 7.98-6.80 (m, 13H, aromatic H), 4.35-4.32 (t, 1H, oxazoline ring CH), 4.30-4.16 (m, 2H, oxazoline ring CH2), 3.86 (s, 3H —OCH3), 3.79 (s, 3H, —OCH3), 2.94-2.92 (d, 1H, benzyl CH2), 2.81 (s, 2H, benzyl CH2), 2.65-2.61 (d, 1H, benzyl CH2), 1.93 (s, 1H, —OH);

¹³C-NMR (CDCl₃): 164.43, 158.30, 158.27, 131.77, 131.76, 131.38, 128.91, 128.72, 128.59, 128.35, 128.25, 127.64, 113.89, 113.60, 113.57, 75.82, 71.98, 68.50, 55.17, 55.15, 41.40, 41.11.

4-2. Synthesis of (2-((S)-4,5-dihydro-2-phenyloxazol-4-yl)-1,3-bis(4-methoxyphenyl)propan-2-yl)(((S)-1,1'-binaphthalene)-2,2'-diyl)phosphite (2-((S)-4,5-dihydro-2-phenyloxazol-4-yl)-1,3-bis(4-methoxyphenyl)propan-2-yl)(((S)-1,1'-binaphthalene)-2,2'-diyl)phosphite was obtained by performing the same method as Example 1-2 above, except that 2-((S)-4,5-dihydro-2-phenyloxazol-4-yl)-1,3-bis(4-methoxyphenyl)propan-2-ol produced in Example 4-1 above was used instead of 2-((S)-4,5-dihydro-2-phenyloxazol-4-yl)-1,3-diphenylpropan-2-ol.

¹H-NMR (CDCl₃): 8.05-6.51 (m, 25H, aromatic H), 4.40-4.39 (t, 1H, oxazoline ring CH), 4.04-3.96 (m, 2H, oxazoline ring CH2), 3.81-3.66 (m, 7H, benzyl CH2, —OCH3), 3.11-3.08 (d, 1H, benzyl CH2), 2.95-2.86 (dd, 2H, benzyl CH2).

4-3. Synthesis of [(2-((S)-4,5-dihydro-2-phenyloxazol-4-yl)-1,3-bis(4-methoxyphenyl)propan-2-yl)(((S)-1,1'-binaphthalene)-2,2'-diyl)phosphite](1,5-COD)iridium(I) tetrakis(3,5-bis(trifluoromethyl)phenyl)borate (Compound 5a-4)

[(2-((S)-4,5-dihydro-2-phenyloxazol-4-yl)-1,3-bis(4-methoxyphenyl)propan-2-yl)(((S)-1,1'-binaphthalene)-2,2'-diyl)phosphite](1,5-COD)iridium(I) tetrakis(3,5-bis(trifluoromethyl)phenyl)borate (Compound 5a-4) was obtained by performing the same method as Example 1-3 above, except that (2-((S)-4,5-dihydro-2-phenyloxazol-4-yl)-1,3-bis(4-methoxyphenyl)propan-2-yl)(((S)-1,1'-binaphthalene)-2,2'-diyl)phosphite produced in Example 4-2 above was used instead of (2-((S)-4,5-dihydro-2-phenyloxazol-4-yl)-1,3-diphenylpropan-2-yl)(((S)-1,1'-binaphthalene)-2,2'-diyl)phosphite.

Example 5: Synthesis of [(2-((R)-4,5-dihydro-2-phenyloxazol-4-yl)-1,3-bis(3,5-dimethylphenyl)propan-2-yl)(((R)-1,1'-binaphthalene)-2,2'-diyl)phosphite](1,5-COD)iridium(I) tetrakis(3,5-bis(trifluoromethyl)phenyl)borate Catalyst (Compound 5b-3)

5-1. Synthesis of 2-((R)-4,5-dihydro-2-phenyloxazol-4-yl)-1,3-bis(3,5-dimethylphenyl)propan-2-ol 2-((R)-4,5-dihydro-2-phenyloxazol-4-yl)-1,3-bis(3,5-dimethylphenyl)propan-2-ol was obtained by performing the same method as Example 1-1 above, except that 3,5-dimethylbenzylmagnesium bromide was used instead of benzylmagnesium chloride and that (R)-methyl 4,5-dihydro-2-phenyloxazole-4-carboxylate was used instead of (S)-methyl 4,5-dihydro-2-phenyloxazole-4-carboxylate.

¹H-NMR (CDCl₃): 7.98-6.84 (m, 11H, aromatic H), 4.34-4.29 (m, 2H, oxazoline ring CH, oxazoline ring CH2), 4.25-4.21 (m, 1H, oxazoline ring CH2), 2.95-2.91 (d, 1H, benzyl CH2), 2.84-2.76 (dd, 2H, benzyl CH2), 2.67-2.63 (d, 1H, benzyl CH2), 2.28 (s, 6H, —CH3), 2.26 (s, 6H, —CH3);

¹³C-NMR (CDCl₃): 164.37, 137.62, 137.57, 136.86, 136.73, 131.36, 128.78, 128.76, 128.41, 128.27, 128.20, 128.14, 127.83, 75.77, 72.32, 68.62, 42.29, 42.27, 21.33, 21.30.

5-2. Synthesis of (2-((R)-4,5-dihydro-2-phenyloxazol-4-yl)-1,3-bis(3,5-dimethylphenyl)propan-2-yl)(((R)-1,1'-binaphthalene)-2,2'-diyl)phosphite (2-((R)-4,5-dihydro-2-phenyloxazol-4-yl)-1,3-bis(3,5-dimethylphenyl)propan-2-yl)(((R)-1,1'-binaphthalene)-2,2'-diyl)phosphite was obtained by performing the same method as Example 1-2 above, except that 2-((R)-4,5-dihydro-2-phenyloxazol-4-yl)-1,3-bis(3,5-dimethylphenyl)propan-2-ol produced in Example 5-1 above was used instead of 2-((S)-4,5-dihydro-2-phenyloxazol-4-yl)-1,3-diphenylpropan-2-ol and that (R)-1,1'-binaphthyl-2,2'-dioxychlorophosphine was used instead of (S)-1,1'-binaphthyl-2,2'-dioxychlorophosphine.

¹H-NMR (CDCl₃): 8.06-6.80 (m, 23H, aromatic H), 4.50-4.45 (t, 1H, oxazoline ring CH), 4.09-4.07 (m, 2H, oxazoline ring CH2), 3.59-3.56 (d, 1H, benzyl CH2), 3.10-3.03 (t, 2H, benzyl CH2), 2.90-2.86 (d, 1H, benzyl CH2), 2.10-2.09 (m, 12H, —CH3).

5-3. Synthesis of [(2-((R)-4,5-dihydro-2-phenyloxazol-4-yl)-1,3-bis(3,5-dimethylphenyl)propan-2-yl)(((R)-1,1'-binaphthalene)-2,2'-diyl)phosphite](1,5-COD)iridium(I) tetrakis(3,5-bis(trifluoromethyl)phenyl)borate (Compound 5b-3)

[(2-((R)-4,5-dihydro-2-phenyloxazol-4-yl)-1,3-bis(3,5-dimethylphenyl)propan-2-yl)(((R)-1,1'-binaphthalene)-2,2'-diyl)phosphite](1,5-COD)iridium(I) tetrakis(3,5-bis(trifluoromethyl)phenyl)borate (Compound 5b-3) was obtained by performing the same method as Example 1-3 above, except that (2-((R)-4,5-dihydro-2-phenyloxazol-4-yl)-1,3-bis(3,5-dimethylphenyl)propan-2-yl)(((R)-1,1'-binaphthalene)-2,2'-diyl)phosphite produced in Example 5-2 above was used instead of (2-((S)-4,5-dihydro-2-phenyloxazol-4-yl)-1,3-diphenylpropan-2-yl)(((S)-1,1'-binaphthalene)-2,2'-diyl)phosphite.

Example 6: Synthesis of [(2-((S)-4,5-dihydro-2-(4-methoxyphenyl)oxazol-4-yl)-1,3-diphenylpropan-2-yl)(((S)-1,1'-binaphthalene)-2,2'-diyl)phosphite](1,5-COD)iridium(I) tetrakis(3,5-bis(trifluoromethyl)phenyl)borate Catalyst (Compound 5a-5)

6-1. Synthesis of 2-((S)-4,5-dihydro-2-(4-methoxyphenyl)oxazol-4-yl)-1,3-diphenylpropan-2-ol 2-((S)-4,5-dihydro-2-(4-methoxyphenyl)oxazol-4-yl)-1,3-diphenylpropan-2-ol was obtained by performing the same method as Example 1-1 above, except that (S)-methyl 4,5-dihydro-2-(4-methoxyphenyl)oxazole-4-carboxylate was used instead of (S)-methyl 4,5-dihydro-2-phenyloxazole-4-carboxylate.
$^1$H-NMR (CDCl$_3$): 7.94-6.91 (m, 14H, aromatic H), 4.34-4.31 (t, 1H, oxazoline ring CH), 4.27-4.17 (m, 2H, oxazoline ring CH2), 3.85 (s, 3H, —OCH3), 3.00-2.97 (d, 1H, benzyl CH2), 2.88 (s, 2H, benzyl CH2), 2.70-2.67 (d, 1H, benzyl CH2), 1.99 (s, 1H, —OH);
$^{13}$C-NMR (CDCl$_3$): 164.39, 162.22, 137.09, 136.89, 130.91, 130.16, 128.20, 126.52, 126.49, 113.67, 75.95, 72.08, 68.42, 55.39, 42.37, 42.06.

6-2. Synthesis of (2-((S)-4,5-dihydro-2-(4-methoxyphenyl)oxazol-4-yl)-1,3-diphenylpropan-2-yl)(((S)-1,1'-binaphthalene)-2,2'-diyl)phosphite (2-((S)-4,5-dihydro-2-(4-methoxyphenyl)oxazol-4-yl)-1,3-diphenylpropan-2-yl)(((S)-1,1'-binaphthalene)-2,2'-diyl)phosphite was obtained by performing the same method as Example 1-2 above, except that 2-((S)-4,5-dihydro-2-(4-methoxyphenyl)oxazol-4-yl)-1,3-diphenylpropan-2-ol produced in Example 6-1 above was used instead of 2-((S)-4,5-dihydro-2-phenyloxazol-4-yl)-1,3-diphenylpropan-2-ol.
$^1$H-NMR (CDCl$_3$): 8.00-6.90 (m, 26H, aromatic H), 4.46-4.41 (t, 1H, oxazoline ring CH), 4.02-3.98 (m, 2H, oxazoline ring CH2), 3.81 (s, 3H, —OCH3), 3.73-3.69 (d, 1H, benzyl CH2), 3.18-3.15 (d, 1H, benzyl CH2), 3.03-2.91 (dd, 2H, benzyl CH2).

6-3. Synthesis of [(2-((S)-4,5-dihydro-2-(4-methoxyphenyl)oxazol-4-yl)-1,3-diphenylpropan-2-yl)(((S)-1,1'-binaphthalene)-2,2'-diyl)phosphite](1,5-COD)iridium(I) tetrakis(3,5-bis(trifluoromethyl)phenyl)borate (Compound 5a-5)

[(2-((S)-4,5-dihydro-2-(4-methoxyphenyl)oxazol-4-yl)-1,3-diphenylpropan-2-yl)(((S)-1,1'-binaphthalene)-2,2'-diyl)phosphite](1,5-COD)iridium(I)tetrakis(3,5-bis(trifluoromethyl)phenyl)borate (Compound 5a-5) was obtained by performing the same method as Example 1-3 above, except that (2-((S)-4,5-dihydro-2-(4-methoxyphenyl)oxazol-4-yl)-1,3-diphenylpropan-2-yl)(((S)-1,1'-binaphthalene)-2,2'-diyl)phosphite produced in Example 6-2 above was used instead of (2-((S)-4,5-dihydro-2-phenyloxazol-4-yl)-1,3-diphenylpropan-2-yl)(((S)-1,1'-binaphthalene)-2,2'-diyl)phosphite.

Example 7: Synthesis of [(2-((S)-4,5-dihydro-2-p-tolyloxazol-4-yl)-1,3-diphenylpropan-2-yl)(((S)-1,1'-binaphthalene)-2,2'-diyl)phosphite](1,5-COD)iridium(I) tetrakis(3,5-bis(trifluoromethyl)phenyl)borate Catalyst (Compound 5a-6)

7-1. Synthesis of 2-((S)-4,5-dihydro-2-p-tolyloxazol-4-yl)-1,3-diphenylpropan-2-ol 2-((S)-4,5-dihydro-2-p-tolyloxazol-4-yl)-1,3-diphenylpropan-2-ol was obtained by performing the same method as Example 1-1 above, except that (S)-methyl 4,5-dihydro-2-p-tolyloxazole-4-carboxylate was used instead of (S)-methyl 4,5-dihydro-2-phenyloxazole-4-carboxylate.
$^1$H-NMR (CDCl$_3$): 7.86-7.18 (m, 13H, aromatic H), 4.32-4.32 (t, 1H, oxazoline ring CH2), 4.26-4.21 (t, 1H, oxazoline ring CH), 4.18-4.13 (dd, 1H, oxzoline ring CH2), 2.98-2.94 (d, 1H, benzyl CH2), 2.86 (s, 2H, benzyl CH2), 2.68-2.65 (d, 1H, benzyl CH2), 2.37 (s, 3H, —CH3), 2.07 (s, 1H, —OH);
$^{13}$C-NMR (CDCl$_3$): 164.70, 141.87, 137.15, 136.95, 130.98, 130.96, 129.07, 128.43, 128.23, 128.22, 126.56, 126.54, 76.02, 72.19, 68.44, 42.42, 42.13, 21.64.

7-2. Synthesis of (2-((S)-4,5-dihydro-2-p-tolyloxazol-4-yl)-1,3-diphenylpropan-2-yl)(((S)-1,1'-binaphthalene)-2,2'-diyl)phosphite (2-((S)-4,5-dihydro-2-p-tolyloxazol-4-yl)-1,3-diphenylpropan-2-yl)(((S)-1,1'-binaphthalene)-2,2'-diyl)phosphite was obtained by performing the same method as Example 1-2 above, except that 2-((S)-4,5-dihydro-2-p-tolyloxazol-4-yl)-1,3-diphenylpropan-2-ol produced in Example 7-1 above was used instead of 2-((S)-4,5-dihydro-2-phenyloxazol-4-yl)-1,3-diphenylpropan-2-ol.
$^1$H-NMR (CDCl$_3$): 7.49-7.00 (m, 26H, aromatic H), 4.47-4.43 (t, 1H, oxazoline ring CH), 4.04-3.97 (m, 2H, oxazoline ring CH2), 3.73-3.70 (d, 1H, benzyl CH2), 3.19-3.15 (d, 1H, benzyl CH2), 3.03-2.92 (dd, 2H, benzyl CH2), 2.38 (s, 3H, —CH3).

7-3. Synthesis of [(2-((S)-4,5-dihydro-2-p-tolyloxazol-4-yl)-1,3-diphenylpropan-2-yl)(((S)-1,1'-binaphthalene)-2,2'-diyl) phosphite](1,5-COD)iridium(I) tetrakis(3,5-bis(trifluoromethyl)phenyl)borate (Compound 5a-6)

[(2-((S)-4,5-dihydro-2-p-tolyloxazol-4-yl)-1,3-diphenylpropan-2-yl)(((S)-1,1'-binaphthalene)-2,2'-diyl) phosphite] (1,5-COD)iridium(I) tetrakis(3,5-bis(trifluoromethyl)phenyl) borate (Compound 5a-6) was obtained by performing the same method as Example 1-3 above, except that (2-((S)-4,5-dihydro-2-p-tolyloxazol-4-yl)-1,3-diphenylpropan-2-yl) (((S)-1,1'-binaphthalene)-2,2'-diyl)phosphite produced in Example 7-2 above was used instead of (2-((S)-4,5-dihydro-2-phenyloxazol-4-yl)-1,3-diphenylpropan-2-yl)(((S)-1,1'-binaphthalene)-2,2'-diyl)phosphite.

Example 8: Synthesis of [(2-((S)-2-(4-(trifluoromethyl)phenyl)-4,5-dihydrooxazol-4-yl)-1,3-diphenylpropan-2-yl)(((S)-1,1'-binaphthalene)-2,2'-diyl)phosphite](1,5-COD)iridium(I) tetrakis(3,5-bis(trifluoromethyl)phenyl)borate Catalyst (Compound 5a-7)

8-1. Synthesis of 2-((S)-2-(4-(trifluoromethyl)phenyl)-4,5-dihydrooxazol-4-yl)-1,3-diphenylpropan-2-ol 2-((S)-2-(4-(trifluoromethyl)phenyl)-4,5-dihydrooxazol-4-yl)-1,3-diphenylpropan-2-ol was obtained by performing the same method as Example 1-1 above, except that (S)-methyl 2-(4-(trifluoromethyl)phenyl)-4,5-dihydrooxazole-4-carboxylate was used instead of (S)-methyl 4,5-dihydro-2-phenyloxazole-4-carboxylate.

$^1$H-NMR (CDCl$_3$): 8.09-7.12 (m, 14H, aromatic H), 4.40-4.37 (t, 1H, oxazoline ring CH), 4.31-4.22 (m, 2H, oxazoline ring CH2) 3.01-2.98 (d, 1H, benzyl CH2), 2.87 (s, 2H, benzyl CH2), 2.72-2.70 (d, 1H, benzyl CH2), 1.90 (s, 1H, —OH).

8-2. Synthesis of (2-((S)-2-(4-(trifluoromethyl)phenyl)-4,5-dihydrooxazol-4-yl)-1,3-diphenylpropan-2-yl)(((S)-1,1'-binaphthalene)-2,2'-diyl)phosphite (2-((S)-2-(4-(trifluoromethyl)phenyl)-4,5-dihydrooxazol-4-yl)-1,3-diphenylpropan-2-yl)(((S)-1,1'-binaphthalene)-2,2'-diyl)phosphite was obtained by performing the same method as Example 1-2 above, except that 2-((S)-2-(4-(trifluoromethyl)phenyl)-4,5-dihydrooxazol-4-yl)-1,3-diphenylpropan-2-ol produced in Example 8-1 was used instead of 2-((S)-4,5-dihydro-2-phenyloxazol-4-yl)-1,3-diphenylpropan-2-ol.

$^1$H-NMR (CDCl$_3$): 8.15-6.99 (m, 26H, aromatic H), 4.51-4.46 (t, 1H, oxazoline ring CH), 4.03-3.98 (m, 2H, oxazoline ring CH2), 3.84-3.80 (d, 1H, benzyl CH2), 3.24-3.20 (d, 1H, benzyl CH2), 2.99 (s, 2H, benzyl CH2).

8-3. Synthesis of [(2-((S)-2-(4-(trifluoromethyl)phenyl)-4,5-dihydrooxazol-4-yl)-1,3-diphenylpropan-2-yl)(((S)-1,1'-binaphthalene)-2,2'-diyl)phosphite](1,5-COD)iridium(I) tetrakis(3,5-bis(trifluoromethyl)phenyl)borate (Compound 5a-7)

[(2-((S)-2-(4-(trifluoromethyl)phenyl)-4,5-dihydrooxazol-4-yl)-1,3-diphenylpropan-2-yl)(((S)-1,1'-binaphthalene)-2,2'-diyl)phosphite](1,5-COD)iridium(I) tetrakis(3,5-bis(trifluoromethyl)phenyl) borate (Compound 5a-7) was obtained by performing the same method as Example 1-3 above, except that (2-((S)-2-(4-(trifluoromethyl)phenyl)-4,5-dihydrooxazol-4-yl)-1,3-diphenylpropan-2-yl)(((S)-1,1'-binaphthalene)-2,2'-diyl)phosphite produced in Example 8-2 above was used instead of (2-((S)-4,5-dihydro-2-phenyloxazol-4-yl)-1,3-diphenylpropan-2-yl)(((S)-1,1'-binaphthalene)-2,2'-diyl)phosphite.

Comparative Example 1: Synthesis of [(2-((S)-4,5-dihydro-2-phenyloxazol-4-yl)propan-2-yl)(((S)-1,1'-binaphthalene)-2,2'-diyl)phosphite](1,5-COD)iridium(I) tetrakis(3,5-bis(trifluoromethyl)phenyl)borate Catalyst (Comparative Compound 1)—(Ref. M. Diiguez et al. JACS, 2009 (131), 12344-12353)

1-1. Synthesis of 2-((S)-4,5-dihydro-2-phenyloxazol-4-yl)propan-2-ol 2-((S)-4,5-dihydro-2-phenyloxazol-4-yl)propan-2-ol was obtained by performing the same method as Example 1-1 above, except that methylmagnesium bromide was used instead of benzylmagnesium chloride.

$^1$H-NMR (CDCl$_3$): 7.98-7.26 (m, 5H, aromatic H), 4.44-4.40 (dd, 1H, oxazoline ring CH2), 4.36-4.32 (t, 1H, oxazoline ring CH), 4.25-4.20 (dd, 1H, oxazoline ring CH2), 2.03 (s, 1H, —OH), 1.34 (s, 3H, —CH3), 1.18 (s, 3H, —CH3)

13C-NMR (CDCl$_3$): 164.96, 131.47, 128.33, 128.28, 127.49, 75.67, 71.56, 68.78, 26.76, 25.04.

1-2. Synthesis of (2-((S)-4,5-dihydro-2-phenyloxazol-4-yl)propan-2-yl)(((S)-1,1'-binaphthalene)-2,2'-diyl)phosphite (2-((S)-4,5-dihydro-2-phenyloxazol-4-yl)propan-2-yl)(((S)-1,1'-binaphthalene)-2,2'-diyl)phosphite was obtained by performing the same method as Example 1-2 above, except that 2-((S)-4,5-dihydro-2-phenyloxazol-4-yl)propan-2-ol produced in Comparative Example 1-1 above was used instead of 2-((S)-4,5-dihydro-2-phenyloxazol-4-yl)-1,3-diphenylpropan-2-ol.

$^1$H-NMR (CDCl$_3$): 7.99-7.20 (m, 17H, aromatic H), 4.48-4.41 (dd, 1H, oxazoline ring CH2), 4.36-4.27 (m, 2H, oxazoline ring CH, oxazoline ring CH2), 1.67 (s, 3H, —CH3), 1.62 (s, 3H, —CH3).

1-3. Synthesis of [(2-((S)-4,5-dihydro-2-phenyloxazol-4-yl)propan-2-yl)(((S)-1,1'-binaphthalene)-2,2'-diyl)phosphite](1,5-COD)iridium(I) tetrakis(3,5-bis(trifluoromethyl)phenyl)borate (Comparative Example 1)

[(2-((S)-4,5-dihydro-2-phenyloxazol-4-yl)propan-2-yl)(((S)-1,1'-binaphthalene)-2,2'-diyl)phosphite](1,5-COD)iridium(I) tetrakis(3,5-bis(trifluoromethyl)phenyl)borate which is Comparative Compound 1 shown below was obtained by performing the same method as Example 1-3 above, except that (2-((S)-4,5-dihydro-2-phenyloxazol-4-yl)propan-2-yl)(((S)-1,1'-binaphthalene)-2,2'-diyl)phosphite produced in Comparative Example 1-2 above was used instead of (2-((S)-4,5-dihydro-2-phenyloxazol-4-yl)-1,3-diphenylpropan-2-yl)(((S)-1,1'-binaphthalene)-2,2'-diyl)phosphite.

[Comparative Compound 1]

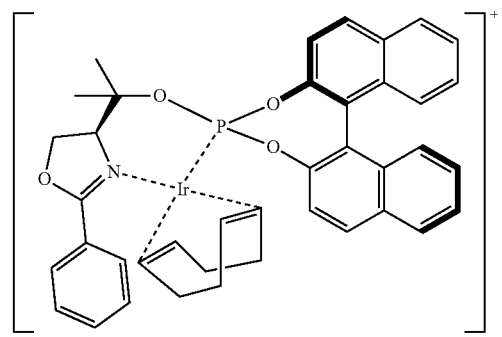

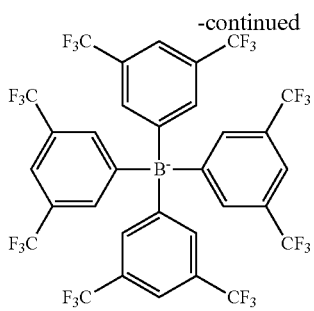

Comparative Example 2: Synthesis of [(((S)-4,5-dihydro-2-phenyloxazol-4-yl)diphenylmethanyl)(((S)-1,1'-binaphthalene)-2,2'-diyl)phosphite](1,5-COD)iridium(I) tetrakis(3,5-bis(trifluoromethyl)phenyl)borate Catalyst (Comparative Example 2)— (Ref. M. Diiguez et al. JACS, 2009 (131), 12344-12353)

2-1. Synthesis of ((S)-4,5-dihydro-2-phenyloxazol-4-yl)diphenylmethanol 2-((S)-4,5-dihydro-2-phenyloxazol-4-yl)propan-2-ol was obtained by performing the same method as Example 1-1 above, except that phenylmagnesium bromide was used instead of benzylmagnesium chloride.

$^1$H-NMR (CDCl$_3$): 7.94-7.18 (m, 15H, aromatic H), 5.49-5.45 (t, 1H, oxazoline ring CH), 4.27-4.19 (m, 2H, oxazoline ring CH2), 2.60 (s, 1H, —OH);

$^{13}$C-NMR (CDCl$_3$): 166.58, 145.96, 144.13, 131.25, 128.51, 128.27, 128.21, 128.13, 127.37, 127.03, 127.00, 126.87, 125.74, 78.20, 73.14, 69.22.

2-2. Synthesis of (((S)-4,5-dihydro-2-phenyloxazol-4-yl)diphenylmethanyl)(((S)-1,1'-binaphthalene)-2,2'-diyl)phosphite (((S)-4,5-dihydro-2-phenyloxazol-4-yl)diphenylmethanyl)(((S)-1,1'-binaphthalene)-2,2'-diyl)phosphite was obtained by performing the same method as Example 1-2 above, except that ((S)-4,5-dihydro-2-phenyloxazol-4-yl)diphenylmethanol produced in Comparative Example 2-1 above was used instead of 2-((S)-4,5-dihydro-2-phenyloxazol-4-yl)-1,3-diphenylpropan-2-ol.

$^1$H-NMR (CDCl$_3$): 7.99-6.51 (m, 27H, aromatic H), 5.65-5.60 (t, 1H, oxazoline ring CH), 4.40-4.36 (t, 1H, oxazoline ring CH2), 4.25-4.20 (t, 1H, oxazoline ring CH2).

2-3. Synthesis of [(((S)-4,5-dihydro-2-phenyloxazol-4-yl)diphenylmethanyl)(((S)-1,1'-binaphthalene)-2,2'-diyl)phosphite](1,5-COD)iridium(I) tetrakis(3,5-bis(trifluoromethyl)phenyl)borate (Comparative Compound 2)

[(((S)-4,5-dihydro-2-phenyloxazol-4-yl)diphenylmethanyl)(((S)-1,1'-binaphthalene)-2,2'-diyl)phosphite](1,5-COD)iridium(I) tetrakis(3,5-bis(trifluoromethyl)phenyl)borate which is Comparative Compound 2 shown below was obtained by performing the same method as Example 1-3 above, except that (((S)-4,5-dihydro-2-phenyloxazol-4-yl)diphenylmethanyl)(((S)-1,1'-binaphthalene)-2,2'-diyl)phosphite produced in Comparative Example 2-2 above was used instead of (2-((S)-4,5-dihydro-2-phenyloxazol-4-yl)-1,3-diphenylpropan-2-yl) (((S)-1,1'-binaphthalene)-2,2'-diyl)phosphite.

[Comparative Compound 2]

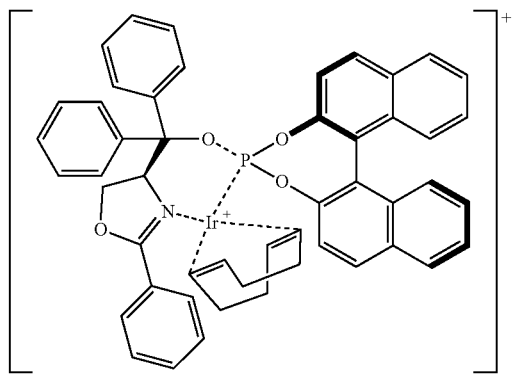

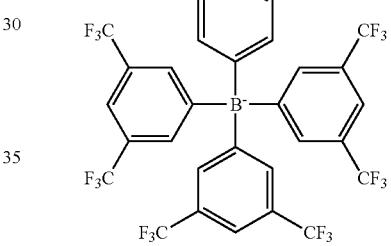

Comparative Example 3 (Comparative Compound 3)

Comparative Compound 3 shown below was purchased from Solvias AG. (CAS No. 583844-38-6).

[Comparative Compound 3]

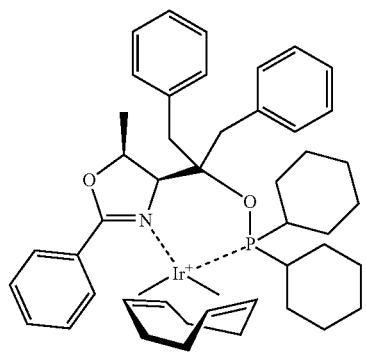

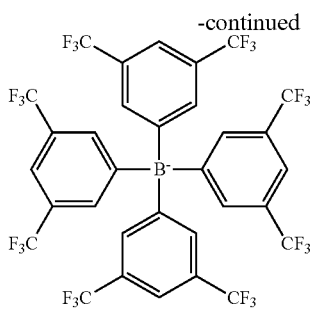

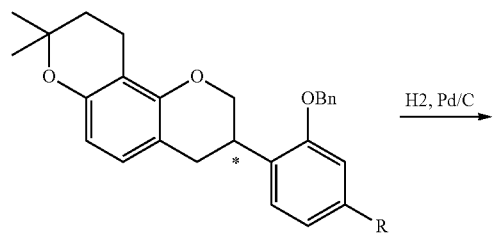

R = Propoxy: compound b-1
    Ethoxy: compound b-2
    Ethyl: compound b-3

R = Propoxy: compound c-1
    Ethoxy: compound c-2
    Ethyl: compound c-3

Test for Asymmetric Hydrogenation Activity

Test Examples 1 to 6 and Comparative Test Examples 1 to 3

In order to confirm the asymmetric hydrogenation activities of the catalysts for asymmetric hydrogenation, a test was performed as follows. Specifically, as shown in the following Test Reaction Scheme 1, asymmetric hydrogenation of Compounds a-1 to a-3, which are prochiral carbon-carbon double bond-containing compounds, was performed using the asymmetric hydrogenation catalysts produced in the Examples and the Comparative Examples, thereby obtaining Compounds b-1 to b-3, respectively.

Next, debenzylation of Compounds b-1 to b-3 was performed to obtain Compounds c-1 to c-3, respectively, which are asymmetrically hydrogenated compounds.

[Test Reaction Scheme 1]

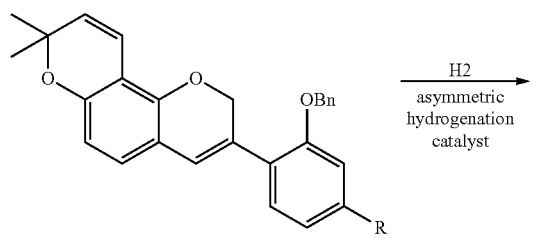

R = Propoxy: compound a-1
    Ethoxy: compound a-2
    Ethyl: compound a-3

Table 1 below shows the S/C weight ratio for 100% conversion, (R)-enantiomer and (S)-enantiomer yields and % enantiomeric excess (ee) of the final compounds obtained using the asymmetric hydrogenation catalysts produced in the Examples and the Comparative Examples.

% ee in Table 1 below was calculated using the following equation:

% ee=(moles of one enantiomer−moles of other enantiomer)/total moles of both enantiomers× 100

In addition, in "S/C weight ratio for 100% conversion" in Table 1 below, "S" denotes each of Compounds a-1 to a-3, "C" denotes each of the asymmetric hydrogenation catalysts, and "S/C weight ratio" denotes the weight ratio of Compound a to the asymmetric hydrogenation catalyst, measured when Compound a reached an exhausted state by complete asymmetric hydrogenation of Compound a.

TABLE 1

| Test Example No. (asymmetric hydrogenation catalyst used) | Starting compound/final compound | S/C ratio (%) for 100% conversion | Content (%) of (R)-enantiomer | Content (%) of (S)-enantiomer | % ee |
|---|---|---|---|---|---|
| Test Example 1-1 (Compound 5a-1 of Example 1) | Compound a-1/ Compound c-1 | 70 | 99.2% | 0.8% | (R)-enantiomer 98.4 |
| Test Example 1-2 (Compound 5a-1 of Example 1) | Compound a-2/ Compound c-2 | 40 | 97.7% | 2.3% | (R)-enantiomer 95.4 |
| Test Example 1-3 (Compound 5a-1 of Example 1) | Compound a-3/ Compound c-3 | 40 | 99.4% | 0.6% | (R)-enantiomer 98.8 |

TABLE 1-continued

| Test Example No. (asymmetric hydrogenation catalyst used) | Starting compound/final compound | S/C ratio (%) for 100% conversion | Content (%) of (R)-enantiomer | Content (%) of (S)-enantiomer | % ee |
|---|---|---|---|---|---|
| Test Example 2-1 (Compound 5b-1 of Example 2) | Compound a-1/ Compound c-1 | 50 | 0.5% | 99.5% | (S)-enantiomer 99 |
| Test Example 2-2 (Compound 5b-1 of Example 2) | Compound a-2/ Compound c-2 | 70 | 1.0% | 99.0% | (S)-enantiomer 98.0 |
| Test Example 2-3 (Compound 5b-1 of Example 2) | Compound a-3/ Compound c-3 | 40 | 0.8% | 99.2% | (S)-enantiomer 98.4 |
| Test Example 3 (Compound 5a-4 of Example 4) | Compound a-1/ Compound c-1 | 50 | 98.9% | 1.1% | (R)-enantiomer 97.8 |
| Test Example 4 (Compound 5b-3 of Example 5) | Compound a-1/ Compound c-1 | 40 | 1.5% | 98.5% | (R)-enantiomer 97.0 |
| Test Example 5 (Compound 5a-5 of Example 6) | Compound a-1/ Compound c-1 | 40 | 97.7% | 2.2% | (R)-enantiomer 95.5 |
| Test Example 6 (Compound 5a-6 of Example 7) | Compound a-1/ Compound c-1 | 40 | 97.3% | 2.7% | (R)-enantiomer 94.6 |
| Comparative Test Example 1 (Comparative Compound 1 of Comparative Example 1) | Compound a-1/ Compound c-1 | 28 | 95.4% | 4.6% | (R)-enantiomer 90.8 |
| Comparative Test Example 2 (Comparative Compound 2 of Comparative Example 2) | Compound a-1/ | N.A. | N.A. | N.A. | N.A. |
| Comparative Test Example 3 (Comparative Compound 3 of Comparative Example 3) | Compound a-1/ Compound c-1 | 25 | 96.4% | 3.6% | (R)-enantiomer 92.8 |

(N.A.: not attained)

R in the above formulas is as defined in the Test Reaction Scheme.

Referring to the (R)-enantiomer and (S)-enantiomer yields and % ee values shown in Table 1 above, it can be seen that the use of the asymmetric hydrogenation catalyst according to one embodiment of the present invention makes it possible to easily achieve optical resolution of (R)-enantiomer and (S)-enantiomer with high optical purities from Compound a, which is a prochiral carbon-carbon double bond-containing compound, compared to the comparative compound catalyst. In addition, from the S/C ratio values shown in Table 1 above, it was confirmed that the asymmetric hydrogenation catalysts of Examples 1, 2 and 4 to 7 of the present invention could achieve complete asymmetric hydrogenation of Compound a, even when they were used in smaller amounts than the asymmetric hydrogenation catalysts of Comparative Examples 1 and 2.

In particular, in the asymmetric hydrogen reaction performed using Comparative Compound 2 produced in Comparative Example 2, Compound b-1, an intermediate produced by reaction of only one of two carbon-carbon double bonds, was produced in a yield of not more than about 29%, and the amount of Compound a-1 that remained was 47% or more, and hence the enantioselectivity of the enantiomers could not be confirmed.

Test Examples 7 and 8

Final compounds shown in Table 2 below were obtained by performing the same method as Test Example 1-1 above, except that the compounds shown in Table 2 below were used instead of Compound a-1. The S/C ratio and R/S selectivity of the final compounds are shown in Table 2 below.

TABLE 2

| Test Example No. (asymmetric hydrogenation catalyst used) | Starting compound | Final compound | S/C weight ratio (%) for 100% conversion | (R)-enantiomer yield | (S)-enantiomer yield | % ee |
|---|---|---|---|---|---|---|
| Test Example 7 (Compound 5a-1) | | | 25 | 98.2% | 1.8% | (R)-enantiomer 96.4 |
| Test Example 8 (Compound 5a-1) | | | 10 | 99.1% | 0.9% | (R)-enantiomer 98.2 |

As shown in Table 2 above, it can be confirmed that the use of the asymmetric hydrogenation catalyst of the present invention makes it possible to obtain enantiomers with excellent enantioselectivity and in high yield.

That is, it can be seen that the asymmetric hydrogenation catalyst according to one embodiment of the present invention can easily achieve optical resolution of (R)-enantiomer and (S)-enantiomer with excellent enantioselectivity, even when an additional process such as a recrystallization process is not performed.

Therefore, it can be seen that the asymmetric hydrogenation catalyst according to one embodiment of the present invention can easily achieve optical resolution of (R)-enantiomer and (S)-enantiomer with excellent enantioselectivity and in high yield, even when it is used in small amounts.

The present invention has been described above with reference to preferred embodiments. Those skilled in the art will appreciate that the present invention may be implemented in modified forms without departing from the essential features of the present invention. Therefore, the disclosed embodiments should be considered in descriptive sense only and not for purposes of limitation. The scope of the invention is indicated by the claims rather than the foregoing description, and all changes which come within the range of equivalence of the claims will be construed as being included in the present invention.

What is claimed is:

1. A catalyst for asymmetric hydrogenation of a carbon-carbon double bond-containing compound, comprising:
   an iridium cation; and
   a ligand of the following Formula 1, which is bonded to the iridium cation

[Formula 1]

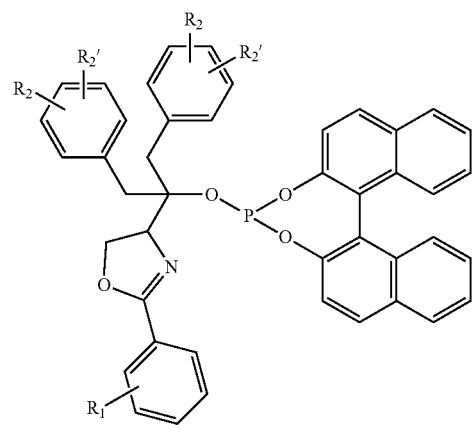

wherein
R$_1$ is a hydrogen atom, a substituted or unsubstituted, straight or branched C$_1$-C$_3$ alkyl group, or a substituted or unsubstituted, straight or branched C$_1$-C$_3$ alkoxy group;

R$_2$ and R$_2$' are each independently a hydrogen atom, a substituted or unsubstituted, straight or branched C$_1$-C$_3$ alkyl group, or a substituted or unsubstituted, straight or branched C$_1$-C$_3$ alkoxy group; and the substituent in the substituted alkyl group and substituted alkoxy group is a halogen atom, a straight or branched C$_1$-C$_3$ alkyl group, or a straight or branched C$_1$-C$_3$ alkoxy group, and wherein the catalyst further comprises a coordination anion of the following Formula 4:

[Formula 4]

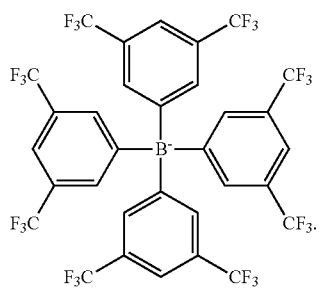

2. The catalyst of claim 1, wherein the ligand of Formula 1 is an enantiomeric compound represented by the following Formula 2a or 2b:

[Formula 2a]

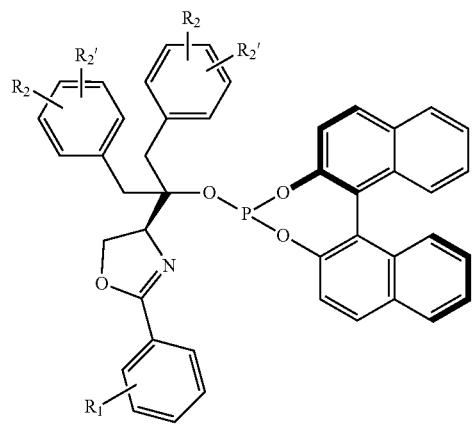

[Formula 2b]

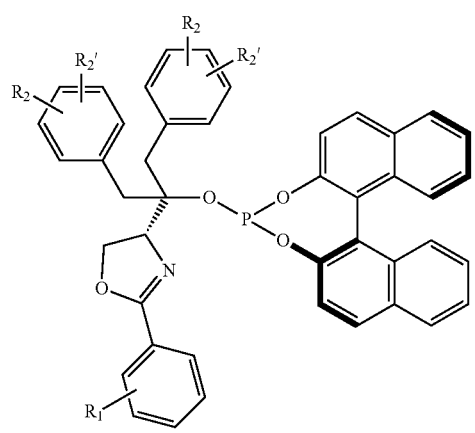

wherein
R₁ is a hydrogen atom, a substituted or unsubstituted, straight or branched $C_1$-$C_3$ alkyl group, or a substituted or unsubstituted, straight or branched $C_1$-$C_3$ alkoxy group;
R₂ and R₂' are each independently a hydrogen atom, a substituted or unsubstituted, straight or branched $C_1$-$C_3$ alkyl group, or a substituted or unsubstituted, straight or branched $C_1$-$C_3$ alkoxy group; and the substituent in the substituted alkyl group and substituted alkoxy group is a halogen atom, a straight or branched $C_1$-$C_3$ alkyl group, or a straight or branched $C_1$-$C_3$ alkoxy group.

3. The catalyst of claim 1, wherein the ligand of Formula 1 is any one of the following compounds:

<Compound 1-1>

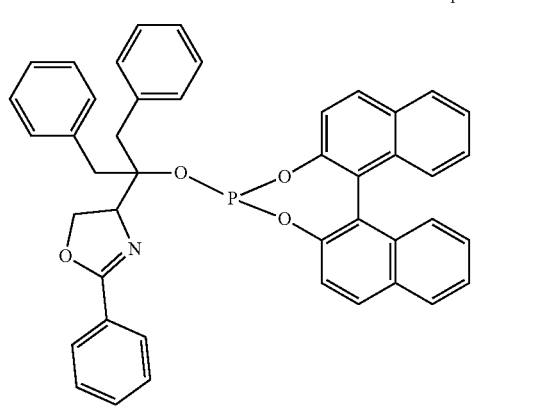

<Compound 1-2>

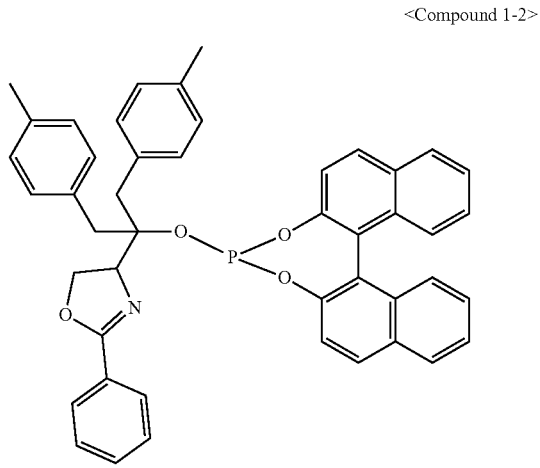

<Compound 1-3>

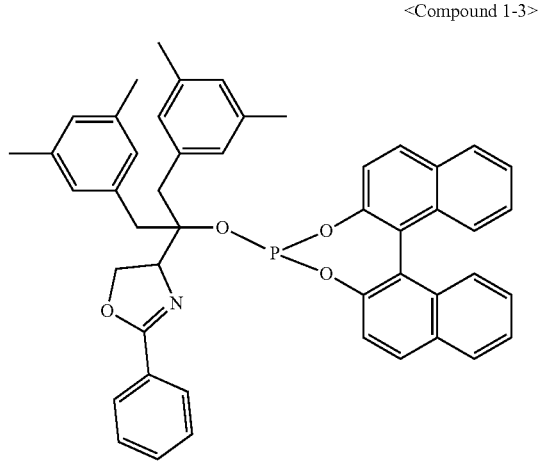

<Compound 1-4>
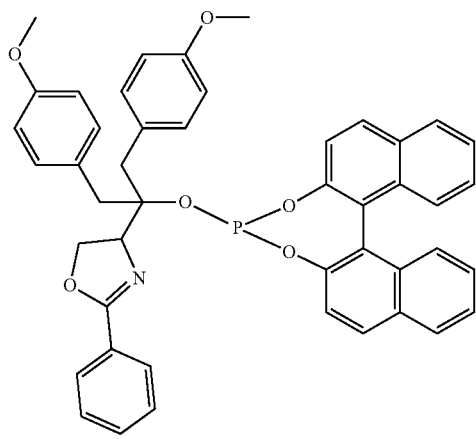

<Compound 1-5>
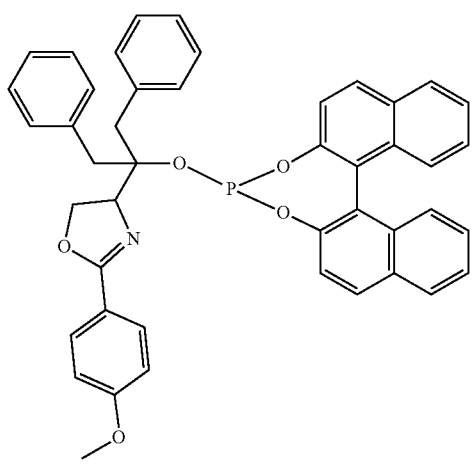

<Compound 1-6>
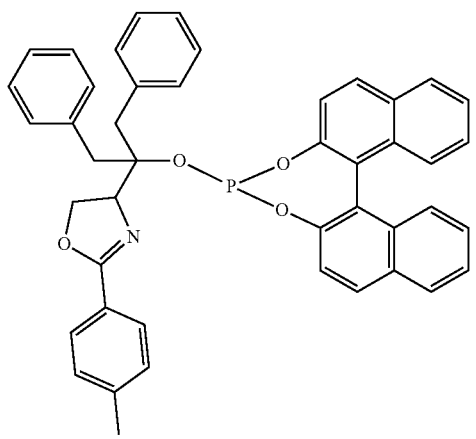

<Compound 1-7>
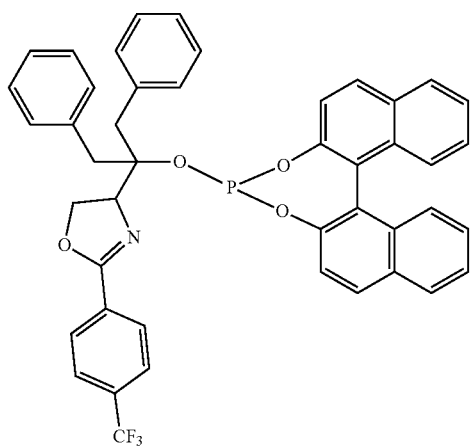

4. The catalyst of claim 1, wherein the catalyst comprises a complex of the following Formula 3:

[Formula 3]

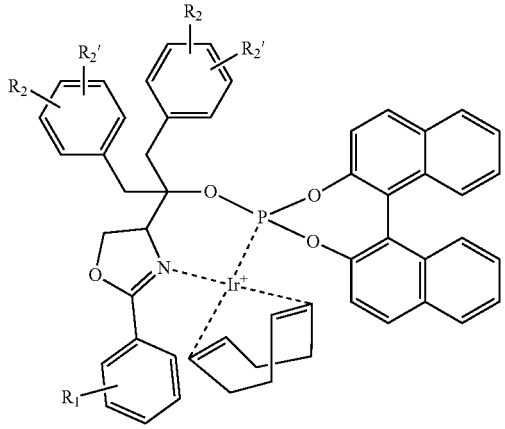

wherein

R$_1$ is a hydrogen atom, a substituted or unsubstituted, straight or branched C$_1$-C$_3$ alkyl group, or a substituted or unsubstituted, straight or branched C$_1$-C$_3$ alkoxy group;

R$_2$ and R$_2$' are each independently a hydrogen atom, a substituted or unsubstituted, straight or branched C$_1$-C$_3$ alkyl group, or a substituted or unsubstituted, straight or branched C$_1$-C$_3$ alkoxy group; and the substituent in the substituted alkyl group and substituted alkoxy group is a halogen atom, a straight or branched C$_1$-C$_3$ alkyl group, or a straight or branched C$_1$-C$_3$ alkoxy group.

5. The catalyst of claim 1, wherein the carbon-carbon double bond-containing compound is represented by the following Formula 6:

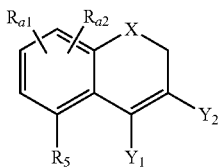

[Formula 6]

wherein

X is oxygen (O) or carbon (C);

$R_{a1}$ and $R_{a2}$ are each independently a hydrogen atom, a substituted or unsubstituted alkyl group having 1 to 3 carbon atoms, a substituted or unsubstituted alkoxy group having 1 to 3 carbon atoms, or a substituted or unsubstituted aryloxy group or aralkyloxy group having 6 to 15 carbon atoms, or $R_{a1}$ and $R_{a2}$ together form a substituted or unsubstituted cyclic or heterocyclic group having 4 to 10 carbon atoms;

$R_5$ is a hydrogen atom or a $C_1$-$C_2$ alkyl group or a $C_1$-$C_2$ alkoxy group;

$Y_1$ and $Y_2$ are different from each other and are each independently a hydrogen atom, a substituted alkyl group having 1 to 3 carbon atoms, a substituted alkoxy group having 1 to 3 carbon atoms, or a

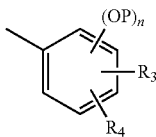

group, wherein $R_3$ and $R_4$ are each independently a hydrogen atom, a hydroxyl group, a substituted or unsubstituted, straight or branched $C_1$-$C_6$ alkyl group, a halogen atom, a substituted or unsubstituted, straight or branched $C_1$-$C_6$ alkoxy group, a substituted or unsubstituted, straight or branched $C_1$-$C_4$ thioalkyl group, a substituted or unsubstituted allyloxy group, or a substituted or unsubstituted aryloxy group;

P represents a protecting group of a substituted or unsubstituted, straight or branched $C_1$-$C_4$ alkyl group, a substituted or unsubstituted benzyl group, a substituted or unsubstituted allyl group, a t-butyldimethylsilyl group, t-butyldiphenylsilyl group, a methylphenylsilyl group, a trimethylphenylsilyl group, $MesO_2$, or p-$TsSO_2$;

n is 1 to 3;

when OP is plural in number, they are the same or different; and the substituent in the substituted alkyl group, substituted alkoxy group, substituted thioalkyl group, substituted aryloxy group, substituted aralkyloxy group, substituted cyclic group and substituted heterocyclic group is a halogen atom, a straight or branched $C_1$-$C_5$ alkyl group, a straight or branched $C_1$-$C_5$ alkoxy group, or a straight or branched $C_1$-$C_3$ thioalkyl group.

6. The catalyst of claim 5, wherein the carbon-carbon double bond-containing compound is a compound represented by the following Formula 7:

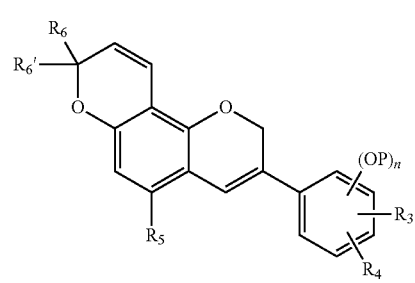

[Formula 7]

wherein $R_3$ and $R_4$ are each independently a hydrogen atom, a hydroxyl group, a substituted or unsubstituted, straight or branched $C_1$-$C_6$ alkyl group, a halogen atom, a substituted or unsubstituted, straight or branched $C_1$-$C_6$ alkoxy group; a substituted or unsubstituted, straight or branched $C_1$-$C_4$ thioalkyl group; a substituted or unsubstituted allyloxy group, or a substituted or unsubstituted aryloxy group;

$R_5$ is a hydrogen atom, a $C_1$-$C_2$ alkyl group or a $C_1$-$C_2$ alkoxy group;

$R_6$ and $R_6'$ are each independently a hydrogen atom or a $C_1$-$C_6$ alkyl group;

P represents a protecting group of a substituted or unsubstituted, straight or branched $C_1$-$C_4$ alkyl group, a substituted or unsubstituted benzyl group, a substituted or unsubstituted allyl group, a t-butyldimethylsilyl group, t-butyldiphenylsilyl group, a methylphenylsilyl group, a trimethylphenylsilyl group, $MesO_2$, or p-$TsSO_2$;

n is 1 to 3;

when OP is plural in number, they are the same or different; and the substituent in the substituted alkyl group, substituted alkoxy group and substituted thioalkyl group is a halogen atom, a straight or branched $C_1$-$C_5$ alkyl group, a straight or branched $C_1$-$C_5$ alkoxy group, or a straight or branched $C_1$-$C_3$ thioalkyl group.

* * * * *